United States Patent
Dark et al.

(10) Patent No.: US 7,515,096 B2
(45) Date of Patent: Apr. 7, 2009

(54) PROGRAM TO GENERATE AN AIRCREW DISPLAY AID TO ASSESS JAM EFFECTIVENESS

(75) Inventors: James Dark, Camarillo, CA (US);
James Buscemi, Camarillo, CA (US);
Scott Burkholder, Moorpark, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 11/901,545

(22) Filed: Sep. 12, 2007

(65) Prior Publication Data

US 2008/0297394 A1 Dec. 4, 2008

Related U.S. Application Data

(63) Continuation-in-part of application No. 11/820,033, filed on May 30, 2007, now Pat. No. 7,427,947.

(51) Int. Cl.
*G01S 7/38* (2006.01)
*G01S 7/40* (2006.01)
*G01S 13/00* (2006.01)
*G01S 7/00* (2006.01)

(52) U.S. Cl. .................. 342/173; 342/13; 342/14; 342/20; 342/89; 342/165; 342/175; 342/176; 342/180; 342/181; 342/195; 455/1

(58) Field of Classification Search ............. 342/13–20, 342/89, 90, 165, 173–176, 179–181, 195; 89/1.11; 455/1, 39, 67.11–67.7, 130, 269, 455/272, 278.1
See application file for complete search history.

(56) References Cited

U.S. PATENT DOCUMENTS 4,025,920 A * 5/1977 Reitboeck et al. ............. 342/13
4,194,205 A * 3/1980 Willmore et al. ............ 342/173

(Continued)

OTHER PUBLICATIONS

DeMinco, Nicholas; "Engineering Manual for the Jammer Effectiveness Model"; National Telecommunications and Information Administration, Institute for Telecommunication Sciences, U.S. Department of Commerce; Boulder, Colorado, USA; Publication 95-322; Sep. 1995.*

(Continued)

*Primary Examiner*—Bernarr E Gregory
(74) *Attorney, Agent, or Firm*—Robert R. Lerma; David S. Kalmbaugh

(57) ABSTRACT

The invention generally relates to the field of computer software particularly to an improved method of providing aircrew decision aids for use in determining the optimum placement of an Electronic Attack (EA) aircraft. The core of the invention is a software program that will dynamically provide the EA flight crew situational awareness regarding a threat emitter's coverage relative to the position of the EA aircraft and to the position of any number of protected entities (PE). The software program generates information to provide visual cues representing a Jam Acceptability Region (JAR) contour, a Jam Assessment Strobe (JAS) and text for display on a number of flexibly configurable display formats posted on display units. The JAR and JAS graphics and text will aid the EA aircrew in rapidly assessing the effectiveness of a given jamming approach.

1 Claim, 19 Drawing Sheets

U.S. PATENT DOCUMENTS

| | | | | |
|---|---|---|---|---|
| 4,581,767 | A * | 4/1986 | Monsen | 455/67.11 |
| 5,128,679 | A * | 7/1992 | Moffat | 342/13 |
| 5,278,908 | A * | 1/1994 | Parikh et al. | 455/1 |
| 5,313,209 | A * | 5/1994 | Michaels et al. | 342/13 |
| 5,940,033 | A * | 8/1999 | Locher et al. | 342/19 |
| 6,084,540 | A * | 7/2000 | Yu | 342/17 |
| 6,476,755 | B1 * | 11/2002 | Senio et al. | 342/15 |
| 6,480,139 | B1 * | 11/2002 | Hoctor | 342/13 |
| 6,704,557 | B1 * | 3/2004 | Krishnamurthy et al. | 455/278.1 |
| 6,748,351 | B1 * | 6/2004 | Hynes et al. | 342/13 |
| 6,771,220 | B1 * | 8/2004 | Ashe et al. | 342/14 |
| 6,894,634 | B2 * | 5/2005 | Gounalis | 342/13 |
| 7,002,509 | B2 * | 2/2006 | Karlsson | 342/90 |
| 7,427,947 | B1 * | 9/2008 | Dark et al. | 342/173 |

OTHER PUBLICATIONS

J. Geikas, "Jammer Effectiveness Model"; National Telecommunications and Information Administration, Institute for Telecommunication Science, U.S. Department of Commerce; Boulder, Colorado, USA; Publication 95-317; May 1995.*

N. DeMinco, "Engineering Manual for the Jammer Effectiveness Model"; National Telecommunications and Information Administration, Institute for Telecommunication Science, U.S. Department of Commerce; Boulder, Colorado, USA; Publication 95-322; Sep. 1995.*

* cited by examiner

PROGRAM TO GENERATE AN AIRCREW DISPLAY AID TO ASSESS JAM EFFECTIVENESS

CROSS-REFERENCE TO RELATED APPLICATIONS

This is a continuation-in-part application claiming the benefit of a parent application Ser. No. 11/820,033 filed on May 30, 2007, the entire disclosure of which is incorporated herein by reference now U.S. Pat. No. 7,427,947.

BACKGROUND OF THE INVENTION

1. Field of the Invention

The invention relates to the field of computer software particularly to an improved method of displaying aircrew decision aids for use in determining the optimum placement of an Electronic Attack (EA) aircraft. The core of the invention is a software program that will dynamically provide display format options to the EA flight crew regarding a threat emitter's coverage relative to the position of the EA aircraft and to the position of protected entities (PE). The software program generates information to populate various display formats providing graphical cues and text representing a Jam Acceptability Region (JAR) contour and a Jam Assessment Strobe (JAS) as well as aircraft position. The display formats will aid the EA aircrew in assessing the effectiveness of a given jamming approach and assists in determining the optimum flight path for both the PE and EA. The optimized flight paths will minimize exposure to threat emitters allowing accomplishment of the mission.

2. Description of the Prior Art

Electronic Warfare (EW) tactics employed by EA aircraft strive to direct electromagnetic energy into a threat radar receiver with sufficient power to prevent the threat radar receiver from accurately detecting or tracking the PE. EW includes the basic concepts of Noise Jamming and Deception Jamming. Key to the successful jamming effort is generating a signal that exceeds the expected target return signal seen by the threat receiver and concentrating the radar jamming signal in the direction of the threat receiver antenna. Barrage noise jamming floods the threat radar receiver with massive amounts of electronic emissions and significantly degrades low technology threat receiver performance. With the evolution of advanced radar concepts the noise jamming approach is less effective against high technology threat emitters. Advanced technology threat radar emitters have led to tuning the EA jamming frequency to match the frequency of the threat emitter and to follow any frequency hopping or other frequency agile characteristics the threat emitter may employ. Deception jamming requires the EA platform to generate a signal that is similar to the target return signal the threat receiving system expects while modifying target characteristics such as return signal strength, range, heading, velocity or acceleration. Overcoming multiple threat emitters employing advanced radar techniques, while transitioning a hostile area and providing protection jamming is a high workload environment for an aircrew. Cockpit display information and aircrew decision aids are required to improve situational awareness for the EA aircrew. It is an objective of this invention to reduce aircrew workload by providing decision aids.

Systems to aid the EA flight crew decision making process in positioning the jamming source carried by the EA are in need of improvement. Current aids available to EA flight crew provide text and rudimentary visual cues depicting gross EA position relative to threat receiver position. Current EA systems force the flight crew to manually incorporate current PE position relative to the position of the EA and threat receiver, then forces the aircrew to manually determine the optimum EW countermeasure to employ driving up aircrew workload. Current systems are incapable of fusing EA jamming capability with projected threat emitter performance information in order to obtain optimal geometrical positioning of the EA relative to threat emitters. The novel method of combining threat emitter system characteristics with EA aircraft capabilities while simultaneously incorporating PE position on a series of flexibly configurable display formats greatly reduces EA aircrew workload and makes the EA more effective.

SUMMARY OF THE INVENTION

The preferred embodiment is a software program that generates information to display a Jam Acceptability Region (JAR) and a Jam Assessment Strobe (JAS) for a multitude of ground based threat emitters updated in real-time. The JAR and JAS are composed of a threat emitter system susceptibility area based on the position of the Protected Entities (PE) and the Electronic Attack (EA) position. The JAR and JAS provides the EA aircrew visual information depicting the current position of the EA aircraft in relationship to ground based threat emitters and in relationship to the accompanied PE. The PE is the aircraft in need of protection jamming. Electronic Warfare (EW) employs tactics to direct electromagnetic energy into the enemy radar receiver to prevent the receiver from accurately detecting the PE. Key to successful radar jamming is obtaining the proper Signal to Noise (S-N) ratio threshold. One of the most critical factors in achieving this S-N ratio is placing the EA jamming signal in the correct geometric position to blind the threat receiver while the threat antenna is slewed in the direction of the PE. The Jam Assessment software program and the integrated display management algorithm that is the preferred embodiment of this invention is a real-time software application that will be employed by the EA aircrew during prosecution of their tactical mission. The Jam Assessment software program provides the aircrew with visual cues that enable the flight crew to ascertain current jamming effectiveness. The Jam Assessment software program receives as input EA and PE positional information. The performance characteristics of the threat emitter and EA jamming capabilities are also received as input to the Jam Assessment software program. The information received as input is processed by designated computers on board the EA aircraft and used to generate the visual cues for display on series of flexibly configurable display formats that allow a rapid assessment of jam effectiveness.

For the EA to determine its instantaneous optimum position it must continually ascertain the position of the PE in relationship to each threat emitter and mathematically generate a JAR along with its own position within the JAR. The Jam Assessment software program must account for the interaction of the JAR and the PE position as the PE transits its intended flight path. The Jam Assessment software program blends the position of the EA aircraft and PE aircraft with the information residing in an electronic library designated as an Electronic Order of Battle (EOB). The positional and EOB information blended by the JAR program is used by the Display Management routine to generate the graphical cues and text in a user selectable format allowing a rapid assessment of jam effectiveness.

The Jam Assessment software program has at its core two components. The first is a JAR processing algorithm which sends results to a second component, an integrated display management routine. The Jam Assessment software program and its components are executed on platform computers and display hardware to provide the user with an improved situational awareness.

DETAILED DESCRIPTION OF THE PREFERRED EMBODIMENT

Figure 1:
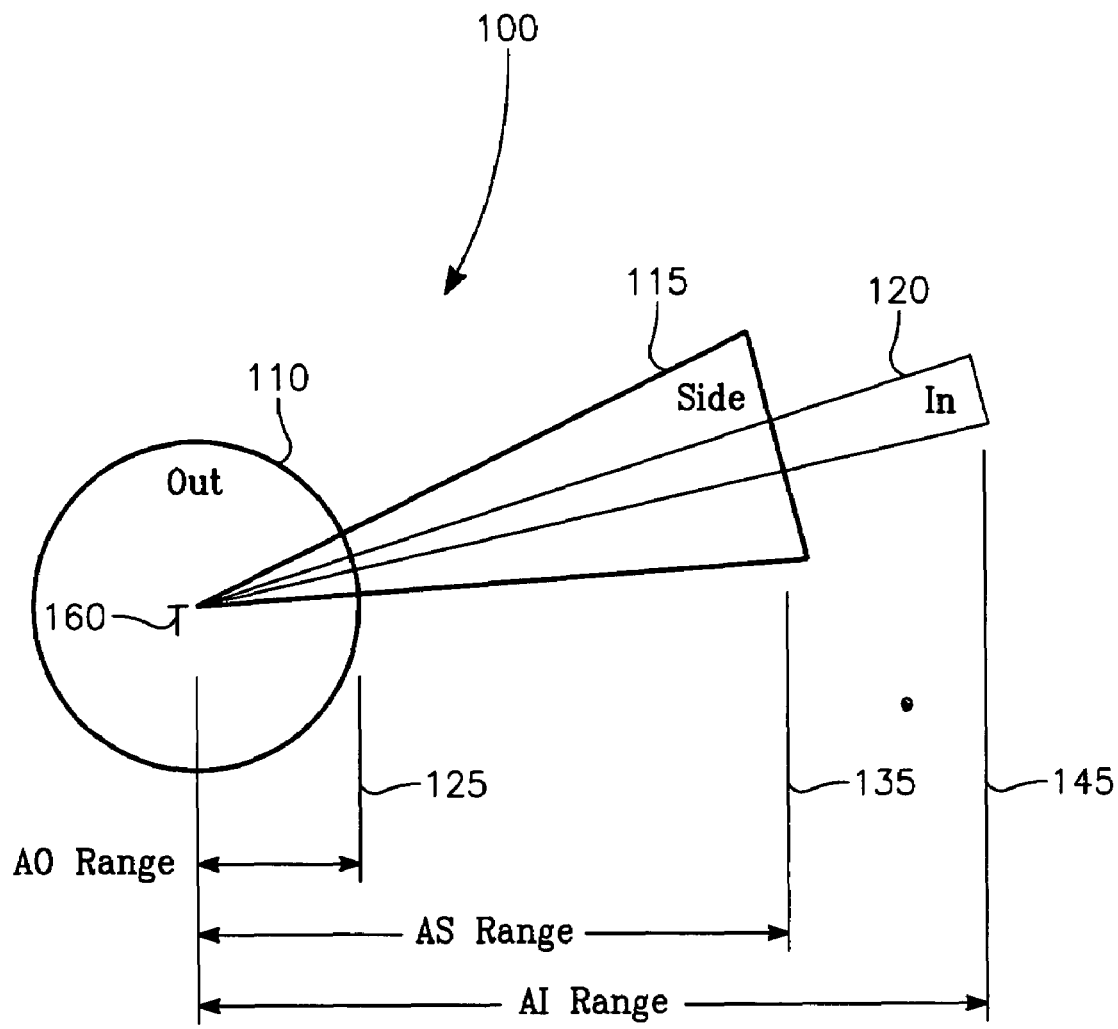
FIG. 1 is a drawing showing the various Jam Acceptability Region (JAR) contours.

Broadly stated, the present invention comprises a method and software module that efficiently and simultaneously receives disparate information and transforms the disparate information into usable graphical displays. The graphical displays convey information that is used to position the EA relative to a threat emitter system. A typical threat emitter system is composed of an antenna, a transmitter, a receiver, a mechanism to position the antenna, electronics to process information received and a user interface. Key to the success of any radar jamming technique is exceeding the Signal to Noise ratio threshold that is an inherent characteristic of the threat emitter system. When the noise signal generated by the EA exceeds the signal return of the PE you have defeated the threat emitter system. Likewise, if the EA generates a stronger yet similar signal to the actual return signal of the PE while shifting a PE parameter, such as range or speed, the threat emitter system will be deceived, masking the true position of the PE. Generating a jamming signal to mask the true position, speed or course of the PE degrades acquisition and tracking performance in the threat emitter system.

Generally, threat radar coverage is viewed as the instantaneous threat radar volume swept vertically and horizontally over time through azimuth and elevation limits defined by the threat radar antenna mount. Multiple three-dimensional concentric ellipsoids extend from the transmitting antenna and compose the threat radar volume. The threat radar volume is composed of a main-lobe ellipsoid, numerous side-lobe ellipsoids and numerous back-lobe ellipsoids. The main-lobe ellipsoid extends much farther than any side-lobe ellipsoid or back-lobe ellipsoid. The main-lobe ellipsoid is the primary beam that is swept across a target to generate a return signal strong enough to be detected by a threat receiver. One critical factor in successful radar jamming is placing the jamming signal emitted by the EA in a position to enter the threat receiver via the threat antenna while the threat antenna is slewed in the direction of the PE.

In addition to the geometric relationship (bearing relationship) of the EA and the PE to the threat emitter system other factors also determine the effectiveness of the threat emitter system. The other factors are the jamming technique and the jamming tactic employed by the EA. Two representative jamming techniques are Preemptive Assignment (PA) and Reactive Assignment (RA). The PA technique is invoked when the threat emitter characteristics and threat emitter location are known before the mission is undertaken. The RA technique is employed when an unexpected threat emitter or threat emitter wave form are encountered during a mission requiring the EA to adapt to the threat. Generally, the PA technique results in Jam Acceptability Region (JAR) contours that are smaller in area and shorter in range relative to the JAR contours associated with the RA technique. A JAR is defined as the family of positions an EA may occupy and still provide effective jamming to protect the PE. The difference in area and range, PA relative to RA, is attributed to the relationship of bandwidth to power. When an EA jams the entire known PA bandwidth for a planned threat emitter lower EA jam power is applied to any specific threat emitter frequency. When the EA detects a threat emitter the RA jamming power may be narrowed into a band focused on the frequency of interest resulting in a JAR that has a larger area and a longer range, relative to the PA JAR.

Three representative jamming tactics are associated with three JAR contours, irrespective of activating either a PA or an RA technique. Referring to FIG. 1, two dimensional depictions of the three dimensional JAR contours are Out of Alignment (O) 110, In Side-Lobe Alignment (S) 115 and In Main-Lobe Alignment (I) 120. The Out of Alignment tactic 110 means the jamming asset can be geographically located anywhere within a hemispherical region centered at the threat emitter and will remain effective in protecting the PE. This is by-far the simplest tactic. The center of JAR 110 represents the location of threat emitter system 160. A disadvantage of the Out of Alignment tactic is that the EA must be close in range 125 to the threat antenna in order to impart adequate energy to exceed the threat receiver signal to noise ratio, regardless of the direction of arrival of the EA jamming signal. To overcome this range vulnerability the S or I tactic is used. Using either the S or I tactic necessitates maintaining a stringent geometric relationship between the EA and the PE to the threat emitter system.

The S tactic results in a conically shaped JAR directly related to the side lobe radiation pattern of the threat emitter antenna. The EA is effective anywhere within JAR 115 provided the EA does not exceed the AS range 135.

Successful jamming of the threat emitter system using the S tactic requires the EA to be within the side-lobe volume of the threat emitter while the main lobe of the threat emitter volume encompasses the PE. While the S tactic increases the standoff range for the EA, relative to the O tactic, the EA is effective only while maintaining the geometric relationship to the PE and to the threat emitter.

The I tactic results in a conically shaped JAR directly related to the main lobe radiation pattern of the threat emitter antenna. A two dimensional depiction of the conically shaped JAR contour is depicted in FIG. 1 item 120. The EA is effective anywhere within JAR 120 provided the EA does not exceed I range 145.

The I tactic provides an improved EA stand off range from the threat antenna but requires that a stringent geometric relationship be maintained between the EA and PE to the threat antenna. The I tactic requires that the EA and PE are in alignment while the threat antenna main-lobe volume encompasses the PE, hence the narrowness of JAR 120.

Each of the techniques and tactics are combined in all permutations to produce a set of jamming approaches to degrade the performance of the threat emitter system. The jamming approaches are: Preemptive Assignment—Out of Alignment (PAO), Preemptive Assignment—In Side-Lobe Alignment (PAS), Preemptive Assignment—In Main-Lobe Alignment (PAI), Reactive Assignment—Out of Alignment (RAO), Reactive Assignment—In Side-Lobe Alignment (RAS), and Reactive Assignment—In Main-Lobe Alignment (RAI).

A given EA jamming approach has a determinable impact upon the threat emitter radar coverage. The JAR represents a volume of space in which the EA may position itself to provide effective jamming to mask the PE or deceive the threat emitter system regarding the true course and speed of the PE. Generating the JAR, assessing jamming effectiveness, determining optimum positioning of the EA and conveying this information to the EA aircrew are objectives of this invention.

Figure 2:
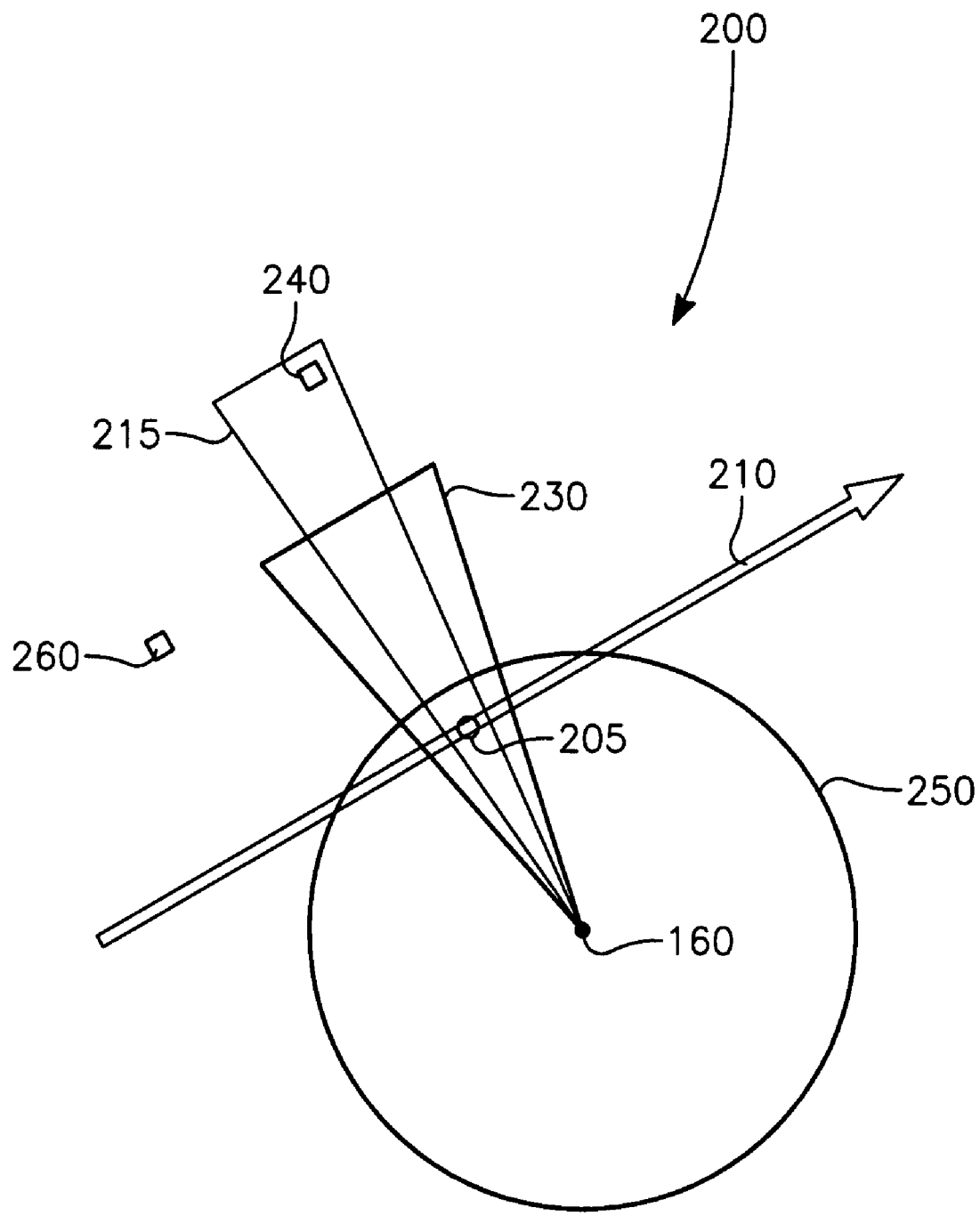
FIG. 2 is a drawing showing the relationships between the JAR, the threat emitter system, the EA and the PE flight path.

Referring to FIG. 2, JAR volumes for PAO-JAR 250, PAS-JAR 230 and PAI-JAR 215 are represented as two dimensional JAR areas. A JAR defines an area in which an EA may position itself for a given jamming approach and provide protective jamming to the PE. As PE 205 progresses along its flight path 210, PAI-JAR 215 and PAS-JAR 230 will remain centered on PE 205. The EA 240 must maintain its position within PAI-JAR 215 and move along with PAI-JAR 215 while jamming threat emitter system 160 using the PAI jamming approach. Positioning EA 240 in the corner of PAI-JAR 215 places EA 240 farthest from threat emitter system 160, optimum for EA safety while providing protective jamming. As another example, EA 260 is the sole EA and is positioned outside of JAR contours 250, 230 and 215. EA 260 would be ineffective in jamming threat emitter 160 regardless of the jamming approach employed resulting in threat emitter system 160 detecting and tracking PE 205. PE 205 is now vulnerable to attack.

Optionally, placing the EA 240 within PAS-JAR 230 would enable the PAS jamming approach that would provide adequate protection for PE 205. It should be noted that the PAS jamming approach would place the EA 240 closer to the threat emitter 160.

Optionally, placing the EA 240 within PAO-JAR 250 would enable the PAO jamming approach that would provide adequate protection for PE 205. It should be noted that the PAO jamming approach would place the EA 240 even closer to the threat emitter 160.

Figure 4:
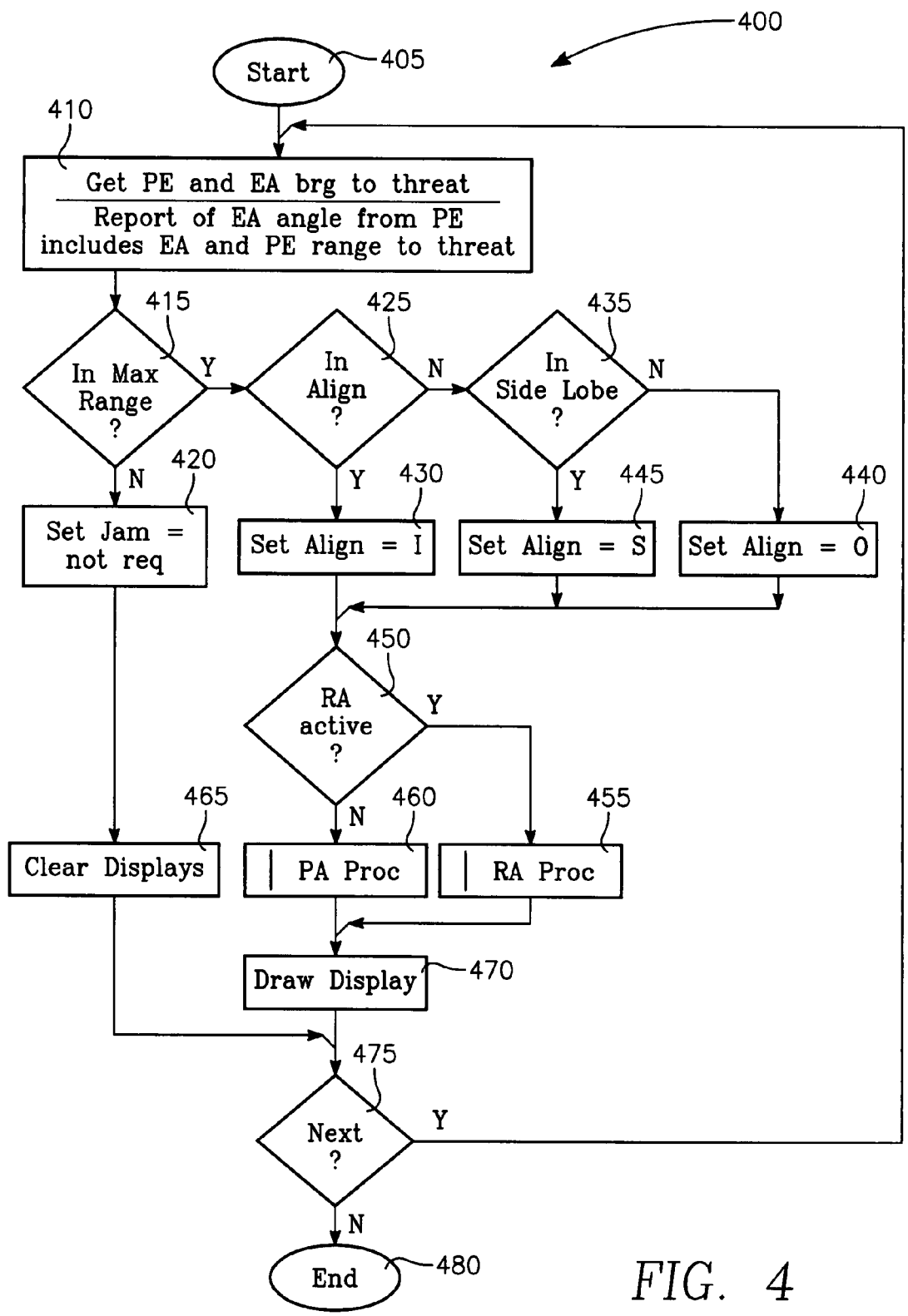
FIG. 4 is a high level software flowchart showing the processing steps for generating the Reactive Assignment and the Preemptive Assignment JAR contours and Jam Assessment Strobe (JAS) displays.

FIG. 4 is a flowchart describing the software processing steps necessary to generate Jam Assessment displays. After program initialization is complete program execution begins, item 405. Own aircraft navigational parameters for the PE and the EA are read into memory buffers where the information is used to initialize navigational parameters. The navigational parameters are provided by a designated suite of aircraft equipment specialized to provide latitude, longitude, aircraft attitude, speed and course. An Electronic Order of Battle (EOB) is a an electronic library of information functioning as a database of information related to the characteristics and locations for threat emitter systems likely to be encountered on a given mission, the expected flight path of the PE and the jamming capabilities of the EA. The EOB is generated during the planning phase of a mission and is derived from sources of intelligence specific to the theater of operation. The EOB is downloaded into computer memory residing in the existing suite of aircraft equipment and is made available to the Jam Assessment software program via designated aircraft interfaces and computers. Both the navigational information and the EOB information are used in processing step 410 to determine the PE and EA bearing to the threat emitter and to determine whether the PE lies within the range of the threat emitter system. Processing step 410 is performed with the assumption that the threat emitter is functioning according to the EOB data and the EA is not radiating a jamming signal.

Relying on the bearing relationships between the EA and PE to the threat emitter and the maximum range of the threat emitter, the software performs a check 415 to determine if the PE is within the maximum range of the threat emitter. If the PE is not within the range of the threat emitter a no jam required flag is set 420, the displays are cleared of stale information in step 465, then step 475 determines program end 480 or directs program control to step 410 for a subsequent iteration.

If the PE is within range of the threat emitter, step 425 determines the alignment of the EA, PE and threat emitter. If the result of alignment check 425 is that the EA, PE and threat emitter are in alignment then a flag is set 430 to "I". If alignment check 425 returns an out of alignment result then a side lobe check is made at step 435. If the side lobe check 435 result is positive for the PE being within the side lobe then the alignment flag is set to "S" 445. If the side lobe check 435 is negative the assumption is the EA, PE and threat emitter are Out of alignment and the alignment flag is set to "O" 440.

Figure 5:
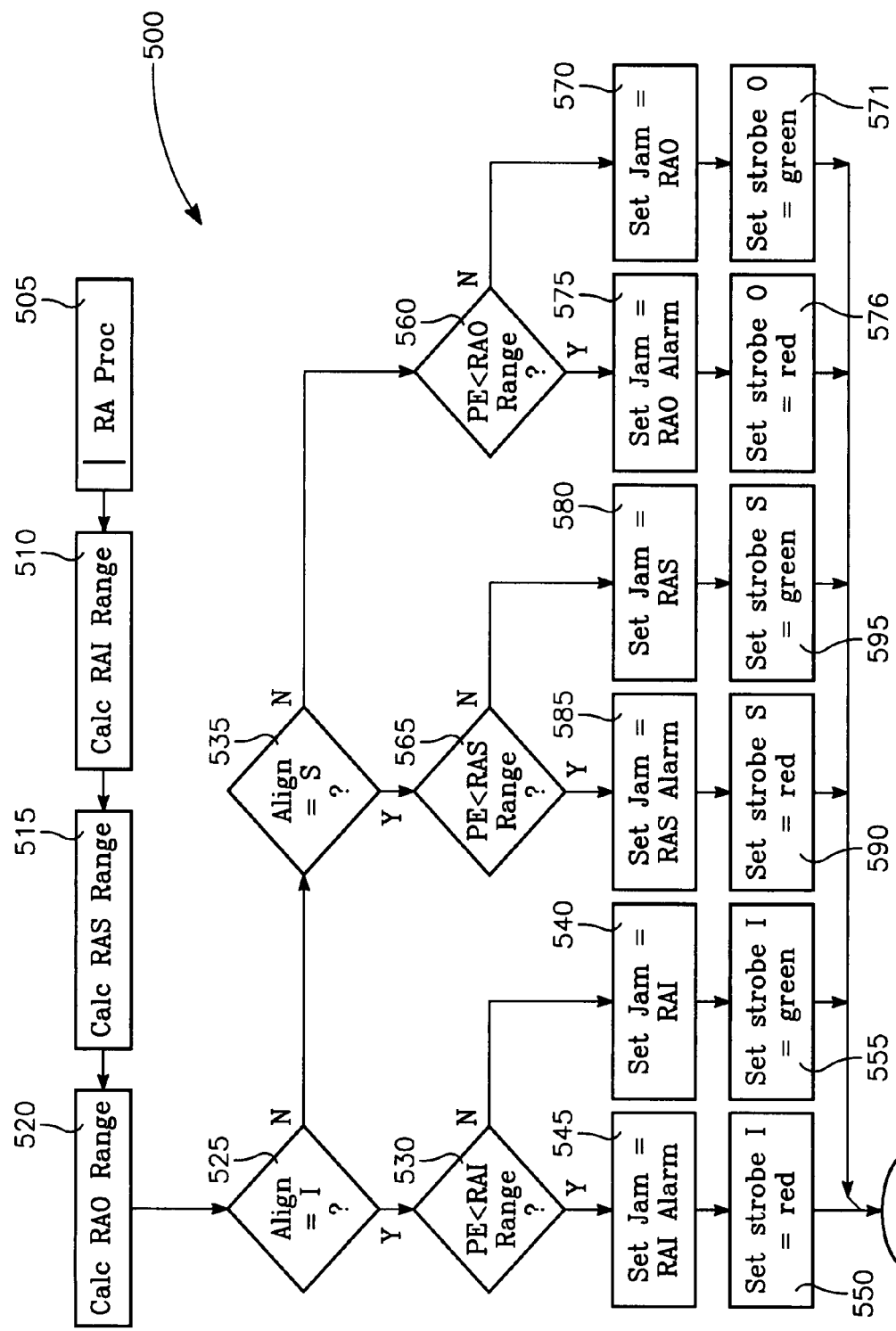
FIG. 5 is a lower level flowchart focusing on the processing steps to generate the Reactive Assignment JAR and JAS information.
Figure 6:
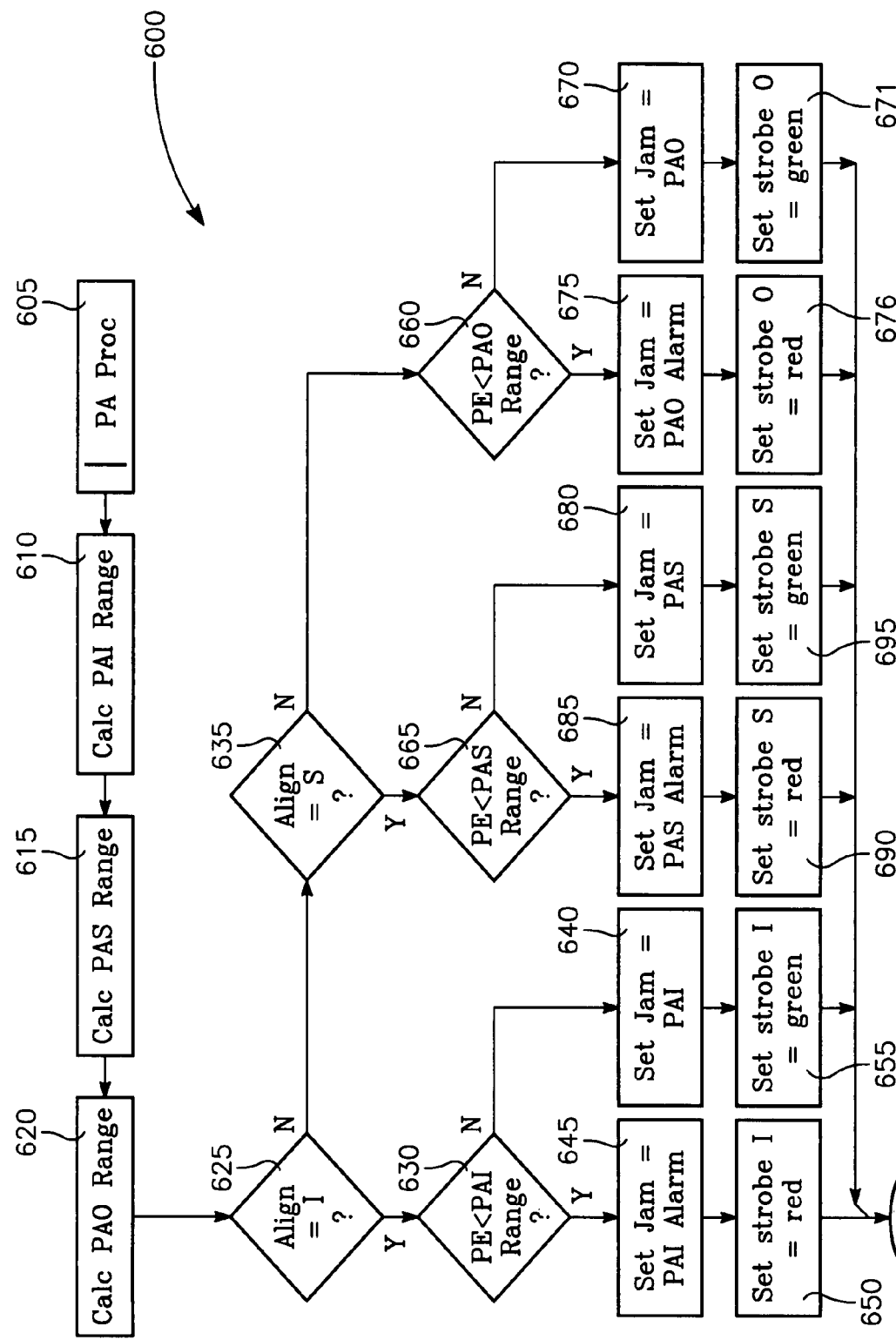
FIG. 6 is a lower level flowchart focusing on the processing steps to generate the Preemptive Assignment JAR and JAS information.

The software must now determine whether to invoke RA processing or PA processing. The software then checks for activation of RA 450, a check to determine whether the EA has detected a threat emitter waveform. If the result of RA 450 check is positive, the threat emitter is not in the EOB, then RA processing 455 is called. Refer to FIG. 5 for a high level flowchart describing RA processing or the detailed description below. If the result of RA 450 check is negative, the threat emitter is in the EOB, then PA processing 460 is called. Refer to FIG. 6 for a high level flowchart of describing PA processing or the detailed description below. Both RA and PA processing routines return to the same software control point in FIG. 4, a call to draw displays 470. Step 475 then determines program end 480 or directs program control to step 410 for a subsequent iteration.

Figure 13:
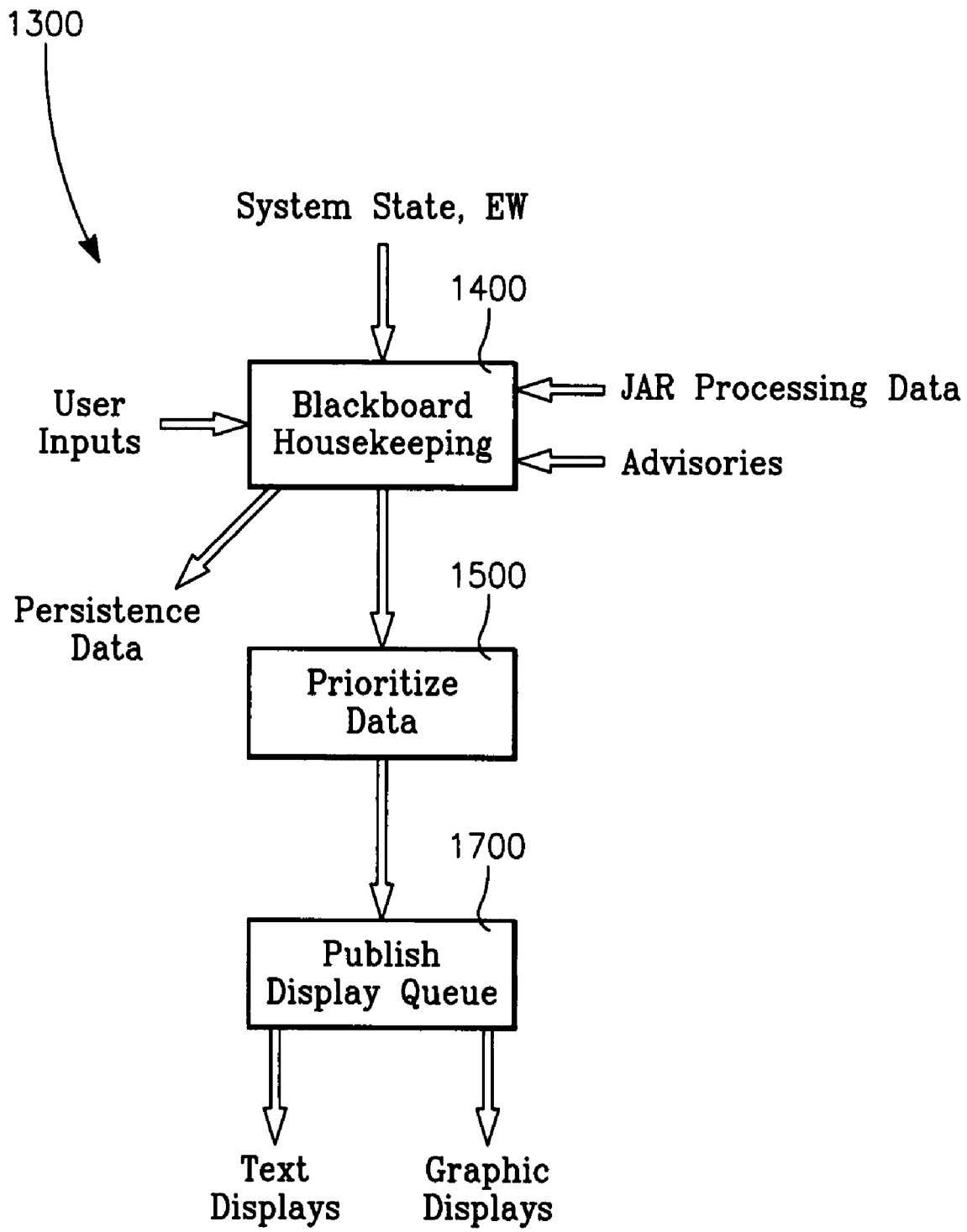
FIG. 13 is a block diagram depicting the high level input and functions of the Display Management routine.
Figure 14:
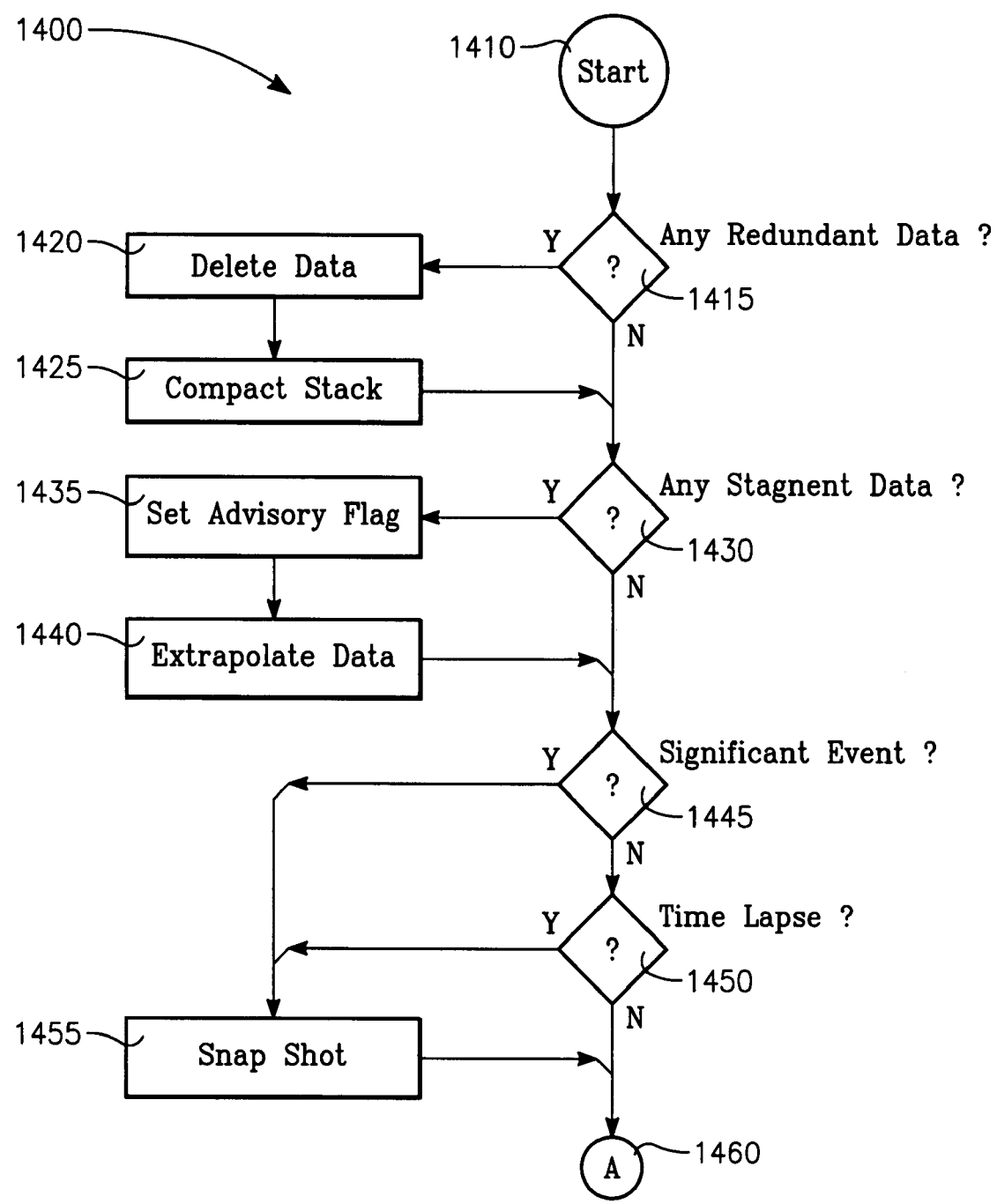
FIG. 14 is a flowchart for the blackboard housekeeping logic that is referenced in the high level functional block diagram in FIG. 13.

The call to draw displays 470 invokes the Display Management routine that is the subject of the high level block diagram in FIG. 13. The JAR and JAS information resides in a series of input buffers updated and accessible to the Display Management routine. The Display Management routine executes in parallel with the JAR processing algorithm using a fixed time interval (FIG. 14 item 1450) for bounding a cycle of operation. The Display Management routine is also capable of starting a new cycle due to a significant event (FIG. 14 item 1445). The displays built by the Display management routine convey information related to overall EA jamming effectiveness and relative location of the PE and EA to the threat emitter.

Referring to FIG. 4 several flags (steps 440, 445 and 430) correspond to the alignment of the PE and the threat emitter. These flags are common to RA 455 and to PA 460 processing routines and must be set prior to calling either RA or PA processing routines.

Referring to FIG. 5, when RA processing is invoked in step 455 (FIG. 4) program flow is routed to step 505 (FIG. 5) and RA processing 505 begins. RA processing determines RAI range 510 by running the Jammer and Tactics Optimization (JATO) power equation 1-1 with the variables and constants set for the RAI jamming approach. RAS range 515 is determined by running JATO power equation 1-1 with the variables and constants set for the RAS jamming approach. RAO range 520 is then determined by running JATO power equation 1-1 with the variables and constants set for the RAO jamming approach. The variable definitions and constants used in equation 1-1 are based on the critical threat attribute parameters residing in the EOB, real time own aircraft navigational information from the PE and EA aircraft and the characteristics of the specific RA jamming approach.

The limits of threat emitter coverage, in the presence of jamming, obtained from the JATO power equation yield a JAR contour. The constants and variable definitions for the JATO power equation 1-1 are provided below.

$$R_{max} = \left\{ \frac{P_R \cdot G_{RT}^2 \cdot \sigma \cdot \lambda^2 \cdot G_m \cdot G_i}{(4\pi)^3 \cdot (S/N)_{min} \cdot L_{RX} \cdot L_{TX} \cdot L_{rp} \cdot B_R \cdot \left[ k \cdot T \cdot N_f + \left(\frac{\lambda}{4\pi}\right)^2 \sum_{i=1}^{N}\left(\frac{P_J \cdot G_{JR} \cdot G_{RJ}}{R_J^2 \cdot B_J} \cdot \frac{\Delta M}{L_P \cdot L_J \cdot L_{RX}}\right) \right]} \right\}^{1/4}$$

JATO Equation 1-1 where:
$R_{max}$=Maximum effective range for a threat emitter
$P_R$=Receiver Power
$G_{RT}$=Receiver Antenna Gain
σ=Radar Cross Section
λ=Wavelength
$G_m$=Modulation Gain
$G_i$=Integration Gain
S/N=Signal to Noise Ratio
$L_{RX}$=Receiver Loss
$L_{TX}$=Transmitter Loss
Lrp=Receiver Processing Loss
$B_R$=Receiver Bandwidth
$k \cdot T \cdot N_f$=constant for transmission noise figure
$P_J$=Jammer Power
$G_{JR}$=Jammer Receiver Antenna Gain
$G_{RJ}$=Jammer Receiver Gain
$R_J$=Range of Jammer
$B_J$=Jammer Bandwidth
ΔM=Modulation Change
$L_P$=Jammer Processing Loss
$L_J$=Jammer Loss The accuracy of $R_{max}$ is dependent upon the accuracy of the critical threat attribute parameters drawn from the EOB, the positional information of the threat emitter system, the positional information of the EA and the EA jamming approach parameters.

Equation 1-1 is a variation of the well known radar range equation. Equation 1-1 is invoked for each jamming approach, for each threat emitter, and for changing PE and EA positions.

FIG. 5 further describes the steps necessary to assemble a JAS representing the RA-JAR information. The In alignment flag (I) is checked at step 525 (FIG. 5). If the I flag is set then a check 530 is made to determine whether the PE is within the RAI range of the threat emitter. If the PE is within range of the threat emitter the Jam flag is set to RAI alarm 545, the JAS color is set to red 550 and the RA routine is exited 598. If the PE is not within the range of the threat emitter then the Jam flag is set to RAI 540 and the JAS color is set to green 555 and the RA routine is exited 598. If the I flag was not set then the Side lobe (S) alignment flag is checked 535.

If the S flag is set then a check 565 is made to determine whether the PE is within the RAS range of the threat emitter. If the PE is within range of the threat emitter the Jam flag is set to RAS alarm 585, the JAS color is set to red 590 and the RA routine is exited 598. If the PE is not within the range of the threat emitter then the Jam flag is set to RAS 580 and the JAS color is set to green 595 and the RA routine is exited 598.

If the S flag was not set then the alignment must be Out of alignment (O). A check 560 is made to determine whether the PE is within the RAO range of the threat emitter. If the PE is within range of the threat emitter the Jam flag is set to RAO alarm 575, the JAS color is set to red 576 and the RA routine is exited 598. If the PE is not within the range of the threat emitter then the Jam flag is set to RAO 570 and the JAS color is set to green 571 and the RA routine is exited 598.

FIG. 6 describes the steps necessary to assemble a JAS representing the PA-JAR information. After calculating the PAI range 610, the PAS range 615 and the PAO range 620 the in alignment flag (I) is checked at step 625. If the I flag is set then a check 630 is made to determine whether the PE is within the PAI range of the threat emitter. If the PE is within range of the threat emitter the Jam flag is set to PAI alarm 645, the JAS color is set to red 650 and the PA routine is exited 698. If the PE is not within the range of the threat emitter then the Jam flag is set to PAI 640, the JAS color is set to green 655 and the RA routine is exited 698. If the I flag was not set then the Side lobe (S) alignment flag is checked 635.

If the S flag is set then a check 665 is made to determine whether the PE is within the PAS range of the threat emitter. If the PE is within range of the threat emitter the Jam flag is set to PAS alarm 685, the JAS color is set to red 690 and the PA routine is exited 698. If the PE is not within the range of the threat emitter then the Jam flag is set to PAS 680 and the JAS color is set to green 695 and the PA routine is exited 698.

If the S flag was not set then the alignment must be Out of alignment (O). A check 660 is made to determine whether the PE is within the PAO range of the threat emitter. If the PE is within range of the threat emitter the Jam flag is set to PAO alarm 675, the JAS color is set to red 676 and the PA routine is exited 698. If the PE is not within the range of the threat emitter then the Jam flag is set to PAO 670 and the JAS color is set to green 671 and the PA routine is exited 698.

Referring to FIG. 4, RA 455 and PA 460 processing routines return control to the draw display routine 470 providing the information necessary to draw the JAR and the JAS. The information to draw the JAR and JAS is in a format suitable for further processing by the designated aircraft display processor. Once the boundaries of the JAR contours and jamming effectiveness are determined any number of user defined displays may be used to present the information to the EA aircrew.

Typical displays are JARs with PE and EA positions plotted with respect to their last known or extrapolated position and a color coded Jam Assessment Strobe (JAS) indicating jamming effectiveness. The length of the JAS represents the maximum effective range for a threat emitter experiencing EA jamming. Each jamming approach (RAO, RAI, RAS, PAO, PAS, PAI) affects the maximum detection range of the emitter adversely. Color coding the JAR contours and JAS is a user preference and is limited by the display processor and the properties of the display hardware residing in the EA aircraft.

Figure 3:
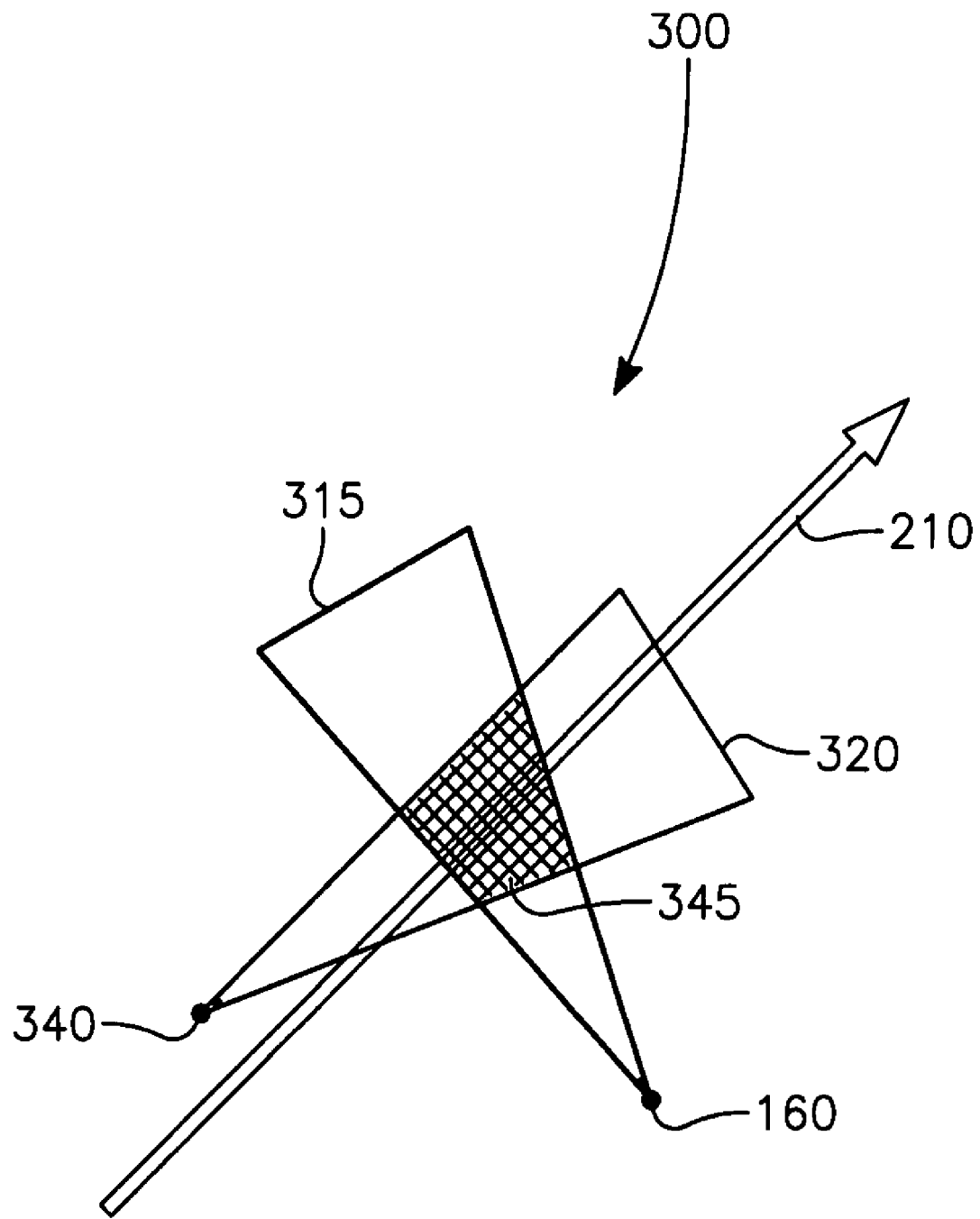
FIG. 3 is a drawing showing multiple threat emitter systems and the JAR overlap area.

In the event multiple threat emitters have overlapping coverage the overlap volume can be determined. Refer to FIG. 3 for a two dimensional representation of the JAR overlap volume for two threat emitters. Threat emitter 160 is associated with JAR 315 while threat emitter 340 is associated with JAR 320. Each point within every JAR has a three dimensional coordinate corresponding to latitude, longitude and altitude. Using EOB data for azimuth and elevation scan limits, the maximum effective range of emitter coverage, positional information describing the latitude, longitude and altitude for a given threat emitter, allows points in common between multiple JARs to be compared. The comparison of JAR points results in common points between the JARs to be identified and used to define an overlap in threat emitter coverage areas. Plotting EA flight path 210 through the threat emitter coverage allows assessment of the EA position with respect to jamming effectiveness. This method of determining the JAR overlap area can be expanded to include any number of threat emitters having overlapping coverage and is only limited by the processing throughput of the interfaces and computers in the EA aircraft.

Figure 7:
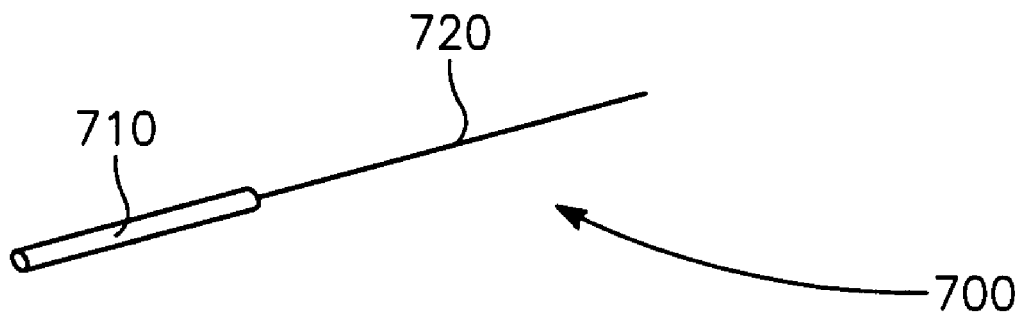
FIG. 7 is a drawing showing the segments that make a JAS.

Referring to FIG. 7, segment 710 represents the current effective (Jammed) range, and segment 720 represents the un-jammed range of the threat emitter. The JAS orientation represents the geometric relationship between the PE and the threat emitter.

Figure 8:
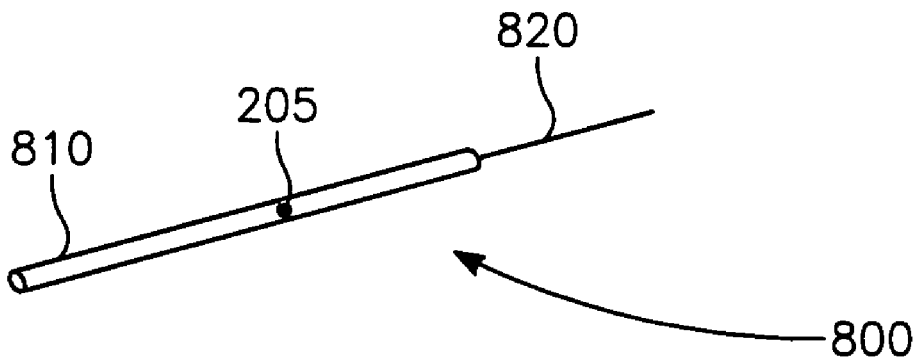
FIG. 8 is a drawing showing JAS and a PE that is detectable by a threat emitter

Referring to FIG. 8, JAS 810 has a length that passes through PE 205 indicating that PE 205 is within the detection range of the threat emitter. JAS 810 would be color coded to indicate that PE 205 is not vulnerable to attack because jamming is effective. FIG. 8 represents the scenario in which the EA is effective despite the PE position within the PAI range of the threat emitter. In the event that PE 205 drifts into line segment 820 which results in jamming not being effective, the EA aircrew is prompted to either: maneuver to address the threat, use other tactical options such as change jam techniques, deploy a kinetic weapon, or advise the PE to maneuver further away from the threat.

Figure 9:
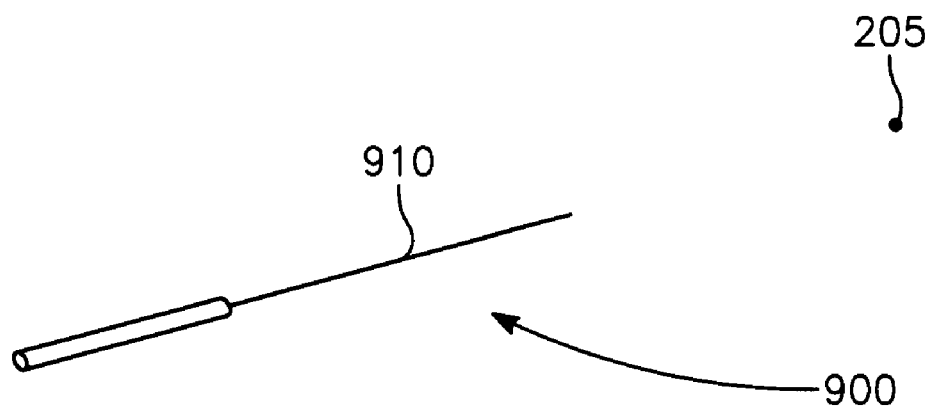
FIG. 9 is a drawing showing a JAS and a PE that is not detectable by a threat emitter system.

Referring to FIG. 9, JAS segment 910 has a length that is short of PE 205 indicating that PE 205 is not within the detection range of the threat emitter. JAS 910 would be color coded to indicate that PE 205 is not vulnerable to attack.

Figure 10:
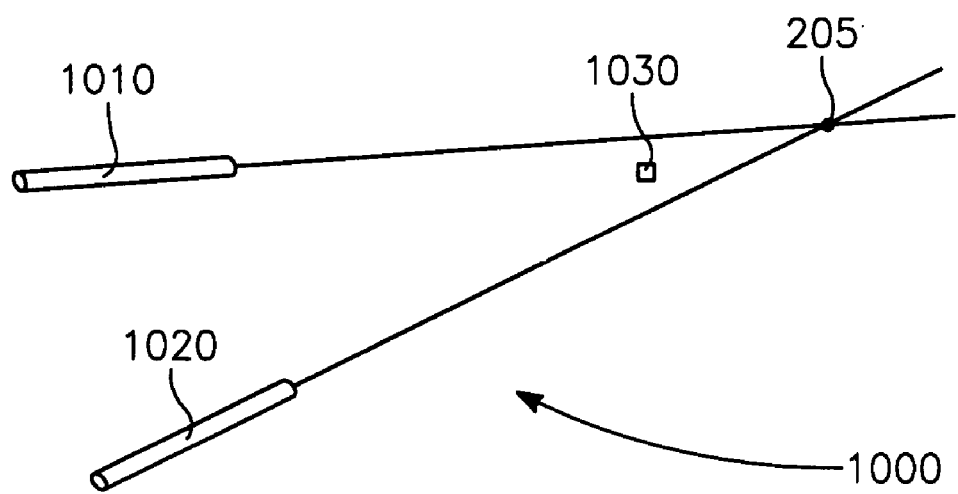
FIG. 10 is a drawing showing two JAS, an effective EA and a protected PE in a representative graphical format.

Another embodiment of this invention generates a display format as depicted in FIG. 10. JAS 1010 and JAS 1020 represents jamming employed by EA 1030 which is positioned in the JAR overlap area of the two threat emitters. In this configuration JAS 1010 and JAS 1020 would be color coded green indicating that PE 205 is not vulnerable to detection by either threat emitter.

Figure 11:
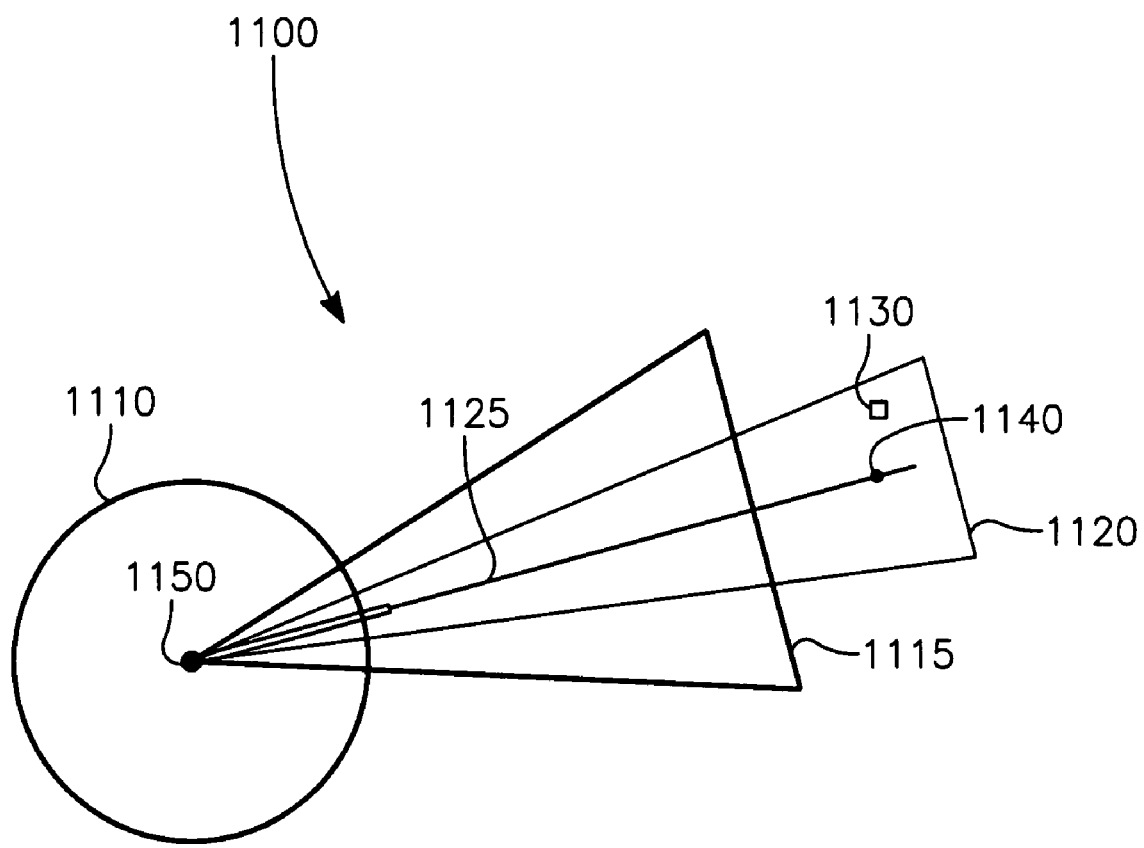
FIG. 11 is a drawing of a combined JAR, JAS, EA and protected PE in a representative graphical format.

FIG. 11 depicts another display embodiment combining the JAR and JAS information with the relative positions of EA 1130 and PE 1140. The explanation for FIG. 11 is applicable to either the PA or RA jamming technique. Assume EA 1030 is positioned within the In alignment JAR 1120 employing the PAI jamming approach. JAS 1125 calculated for the PAI jamming approach falls short of PE 1140 and would be colored green indicating that PE 1140 is not vulnerable to attack. At a glance the aircrew can determine that PE 1140 is safe from detection by threat emitter 1150 and that EA 1130 could maneuver anywhere within JAR 1120 while employing PAI jamming and remain effective in protecting PE 1140. Equally important, is the situational awareness that shifting to the PAS jamming approach and maneuvering EA 1130 into JAR 1115 would provide adequate protection for PE 1140. Equally important is the situational awareness that shifting to PAO jamming and maneuvering into JAR 1110 would also provide protection for PE 1140. FIG. 11 provides critical information to the EA aircrew in a format that is easy to understand, is used to ascertain jamming effectiveness and improves the ability to adapt to changing conditions. The capability to assess jam effectiveness as described in the preferred embodiment fills a need unmet by the current aircraft displays.

Figure 12:
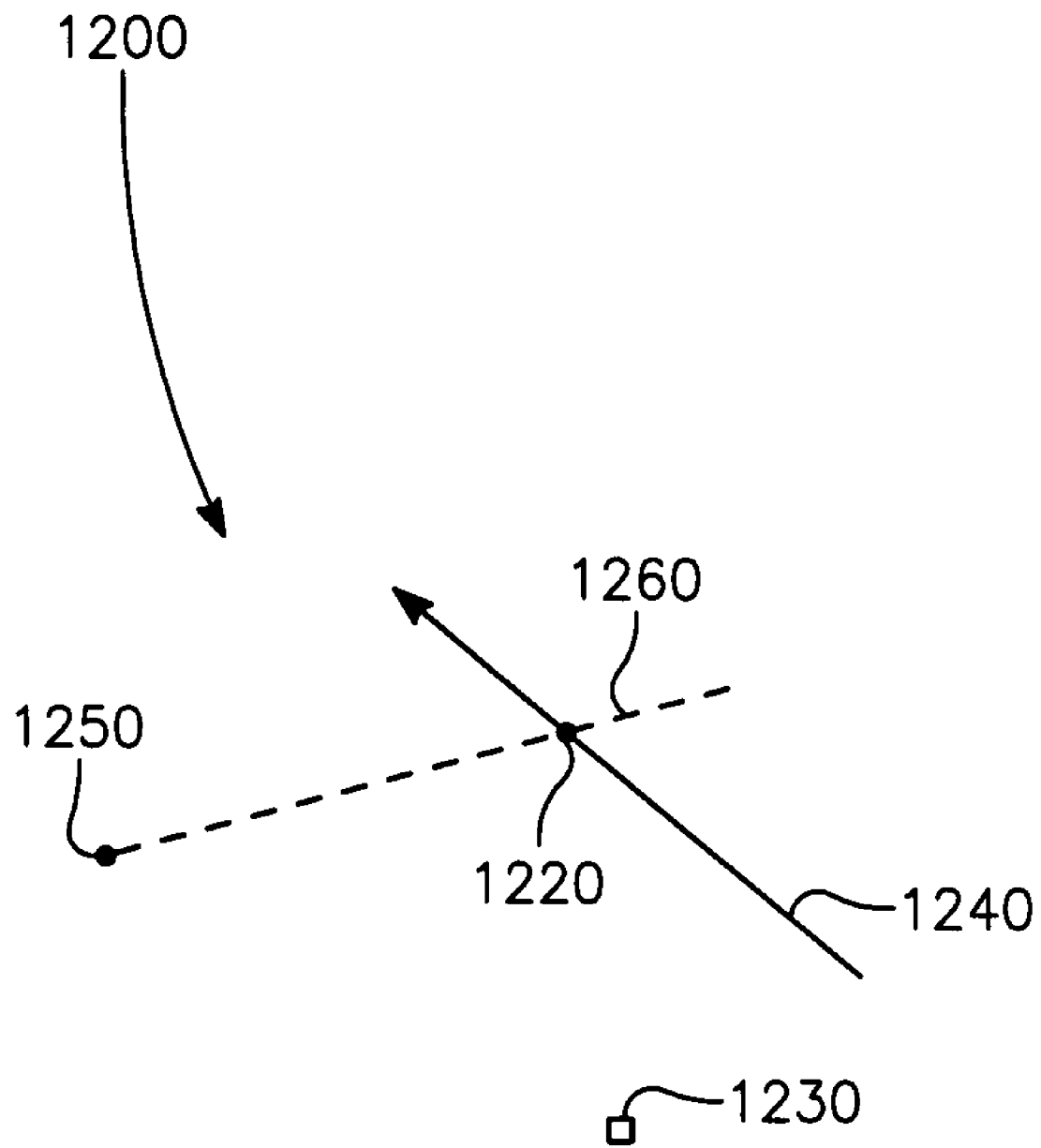
FIG. 12 is a drawing of undesignated threat emitters.

Providing information to the EA aircrew related to detected threat emitters not currently assigned a jamming approach is critical to overall situational awareness. FIG. 12 represents the scenario in which threat emitter 1250 has been defined by the EA 1230 and an assessment of PE 1220 vulnerability has been made along flight path 1240. At this point threat emitter 1250 has not been assigned a jamming approach, as indicated by the dashed segment 1260. At a glance, EA 1230 is able to determine that threat emitter 1250 is a threat that requires EA 1230 jamming or that flight path 1240 needs to be altered to avoid detection.

This specification has described in detail the algorithm to generate different JAR and JAS graphical elements as well as the information suitable for display in a textual format. The specification now turns to the detailed description of the Display Management routine.

Referring to FIG. 13, in general the Display Management routine is comprised of multiple distinct tasks. The first task is the Blackboard Housekeeping task 1400 which uses as input JAR Processing generated data, advisory data, system state information and user inputs. The results of the Blackboard Housekeeping task 1400 are used as input to the Prioritize Data task 1500 which assures that time critical events are processed first. The results of the Prioritize Data task 1500 are fed to the Publish Display Queue task 1700 which provides the information to drive the display units and to perform the lower priority tasks of display maintenance. The output of the Publish Display Queue task 1700 are used to drive platform display processors which present information as depicted in the representative displays of FIG. 17 and FIG. 18. Operation of the Display Management routine (FIG. 13) will now be described in detail.

In general, the Blackboard Housekeeping task (FIG. 13 item 1400) assures that the EW system state information and external environment data elements are within data senescence limits while eliminating any unnecessary redundant data. Referring to FIG. 14, the Blackboard Housekeeping task is initiated 1410 by a call from the JAR Processing algorithm (FIG. 4 step 470). Asynchronous reports from various aircraft subsystem and jamming system components are read from a series of input buffers and stored in a single unified data structure that facilitates random access to data elements and supports system persistence.

System persistence is the ability of the overall Display Management routine to recover to the last known state using a data snap-shot 1455. The data snap-shot is stored in short term memory and is composed of attributes and values necessary to restore display functionality in the event of a system reset or catastrophic loss of real-time data. The data snap-shot is also stored in long term digital memory to support post flight analysis and assessment of EW system operation.

The Blackboard Housekeeping functionality includes a check for redundant data 1415 and then deletes any redundant data 1420. Stack manipulation 1425 is then performed to assure that an accessed data element is the appropriate data element. Stack manipulation 1425 is also necessary if a First-In-First-Out (FIFO) array of limited size is required or if a specific time-out for data senescence is needed. A check for any stagnant data 1430 in the stack is then performed. This stagnant data check 1430 sets an advisory 1435 indicating that data extrapolation is necessary 1440 for aged but usable data. It is well known within the state of the art that velocity and acceleration information are used to extrapolate a known aircraft position over a given length of time to determine a new position for the aircraft. A check is then made to determine if a significant event 1445 has occurred.

A significant event is an event that has an impact upon the role of the EA in protecting the PE. A significant event may be the change in operational status of a key piece of the EW suite, a weapon failure, a sudden change in status of a PE, a sudden change in the threat emitter characteristics or detection or loss of a threat emitter system. If a significant event has occurred than a snap-shot 1455 is taken and stored as persistence data for storage in short term memory and storage in long term memory on a digital recording medium.

The snap-shot 1455 of system activity is also taken periodically and is controlled by a snap shot timer which is checked for a time out. If the snap shot time out has not occurred program execution continues 1460. If the snap shot timer has timed out then a snap shot 1455 is taken, after which program flow continues 1460.

It should be noted that the own aircraft navigation updates are a nominal 1 second rate and thus becomes the primary candidate for the execution time limit for the Blackboard Housekeeping task.

The basis for user interaction with the Display Management routine is through the use of a rotary of user options enabled by a push-tile. A push-tile is a hardware button that is integral to a multi-function display unit. A push-tile is software programmable in function and labeling. Numerous push-tiles surround the display area of the display unit to accept user commands to control display formats and for operating aircraft systems. A push-tile button is immediately adjacent to the label that defines the push-tile function. The push-tile buttons are not shown in the figures as the quantity, spacing, size and appearance of push-tile buttons vary according to the size of the display unit and is unique to each manufacturer.

The software to support push-tile function definition and labeling is unique to the display unit that resides in the aircraft cockpit. Configuring the push-tile labels and configuring the push-tiles to control functions are necessary to implement the invention's preferred embodiment and are documented by the display unit manufacturer.

Figure 17:
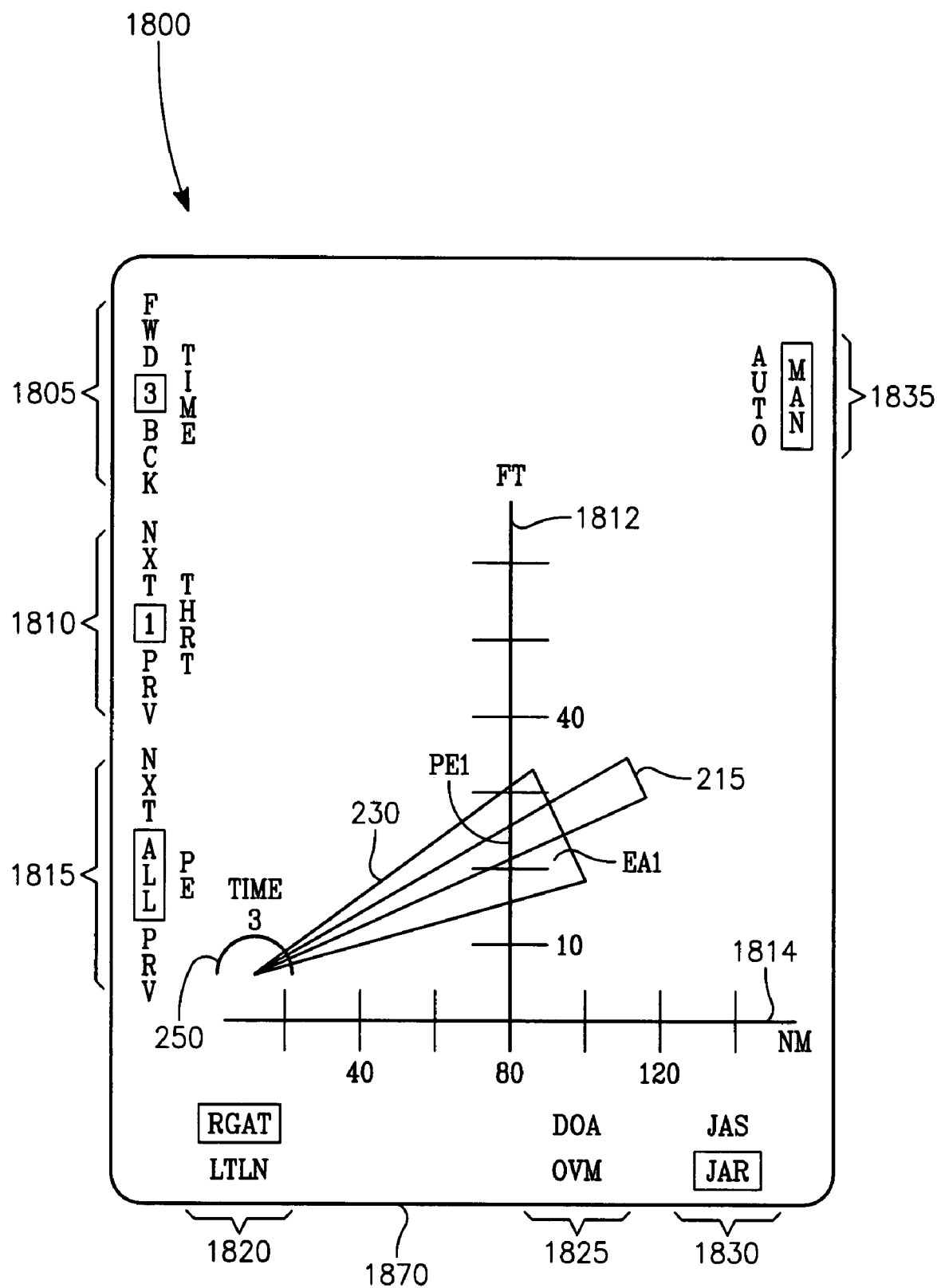
FIG. 17 is a drawing containing a representative display format using graphical cues and text generated by the integrated display management routine using the results of the JAR processing algorithm.
Figure 18:
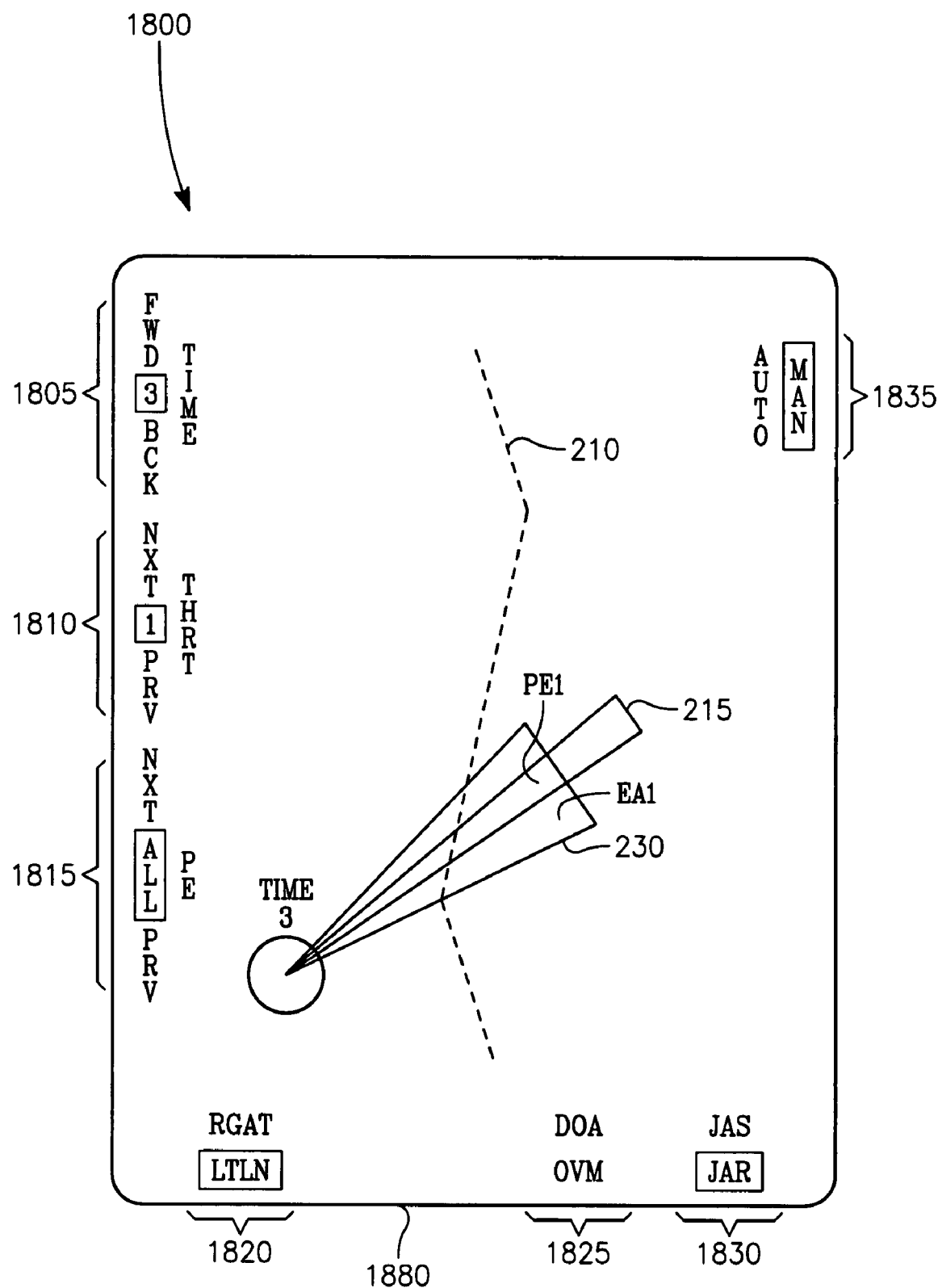
FIG. 18 is a drawing containing a second representative display format using graphical cues and text generated by the integrated display management routine using the results of the JAR processing algorithm.

In the preferred embodiment, a user is provided positive feedback that a push-tile depression is acknowledged by observing a display update, observing a change in the box surrounding a label corresponding to a given push-tile position or both. For the preferred embodiment, FIG. 18 represents a default display format providing the user an option of selecting between either a range and altitude display (RGAT) format or a latitude and longitude format (LTLN) (item 1820). When the user depresses the push-tile (not shown) directly below item 1820 the display transitions to that of FIG. 17, an RGAT format with RGAT (item 1820) boxed. A subsequent depression of the push-tile directly below item 1820 transitions the display format to a range and bearing format (not shown) or to any other user defined format. This concept is best described as a rotary of display formats enabled by repeated depression of a single push-tile. The push-tile rotary concept is key to the operation of the Display Management routine. A push-tile may also be configured to operate as an off and on switch to enable a single user defined command.

As previously discussed, the JAR processing is capable of generating information related to the position of the EA and PE relative to a threat emitter. Additionally, multiple overlapping JARs can be generated for display. All of this information is available for display in flexible formats that are configured by the user.

Figure 15A:
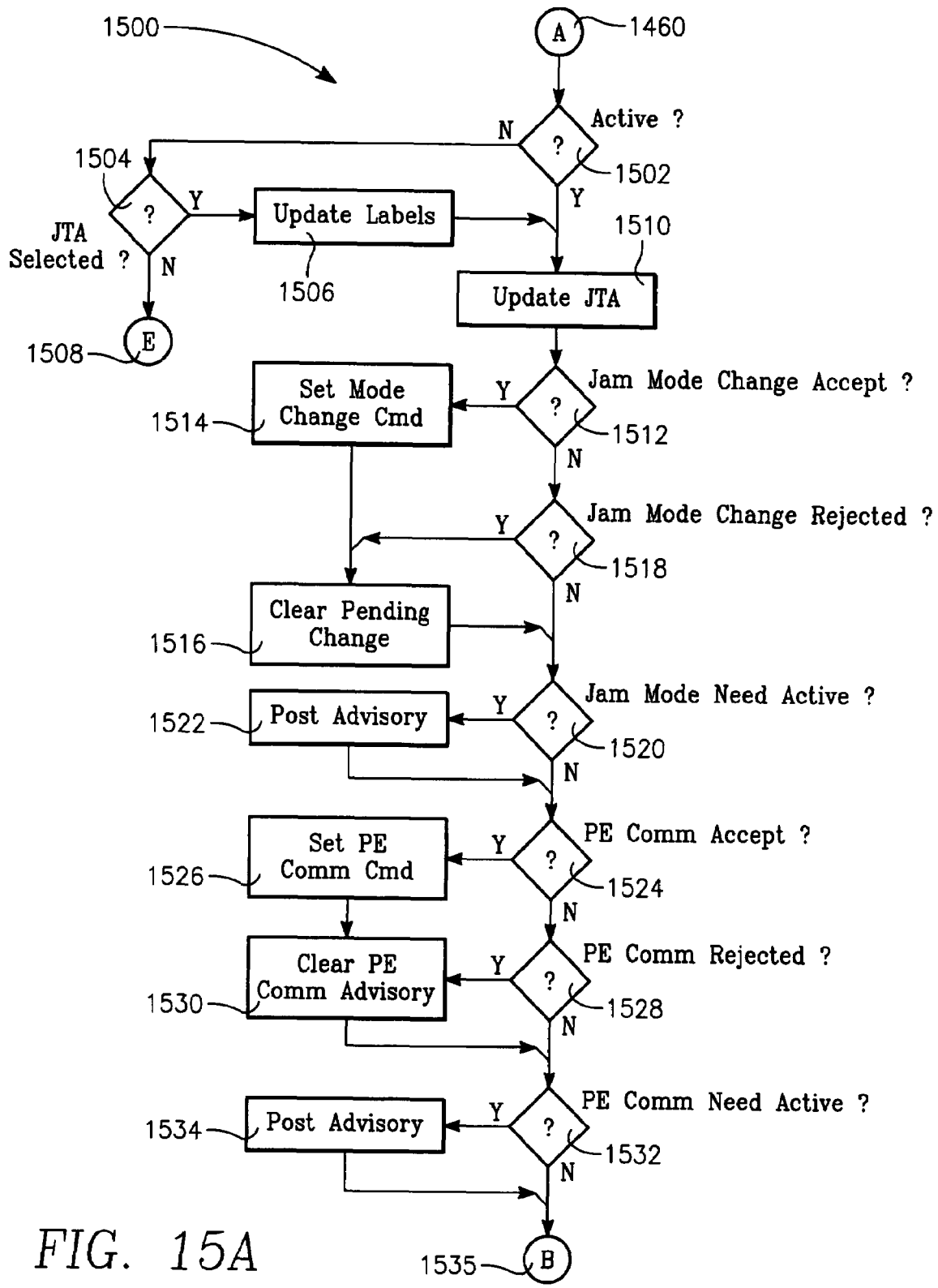
FIG. 15A is a first part of a flowchart for the display logic that is referenced in the high level functional block diagram in FIG. 13.
Figure 15B:
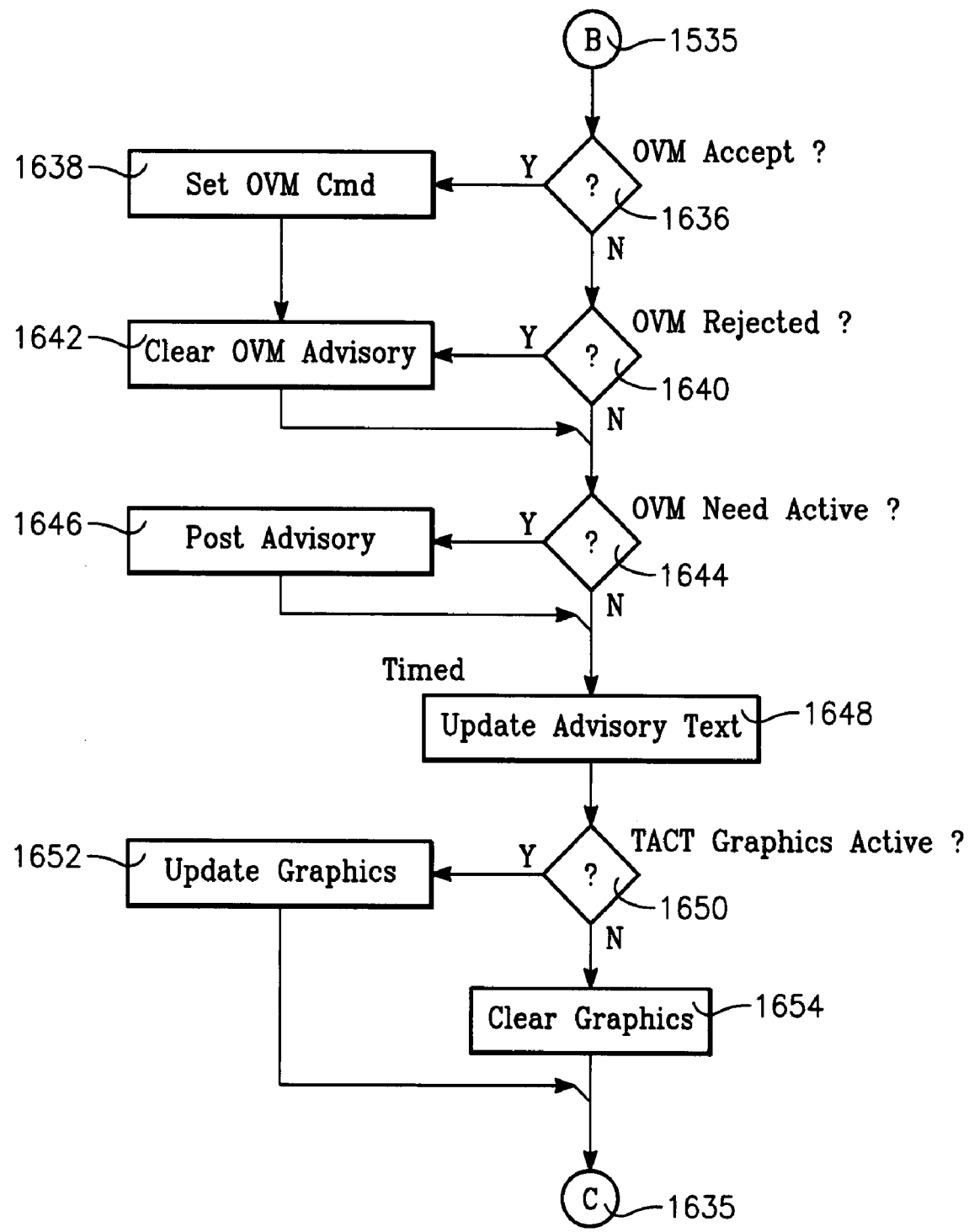
FIG. 15B is a second part of a flowchart for the display logic that is referenced in the high level functional block diagram in FIG. 13.
Figure 15C:
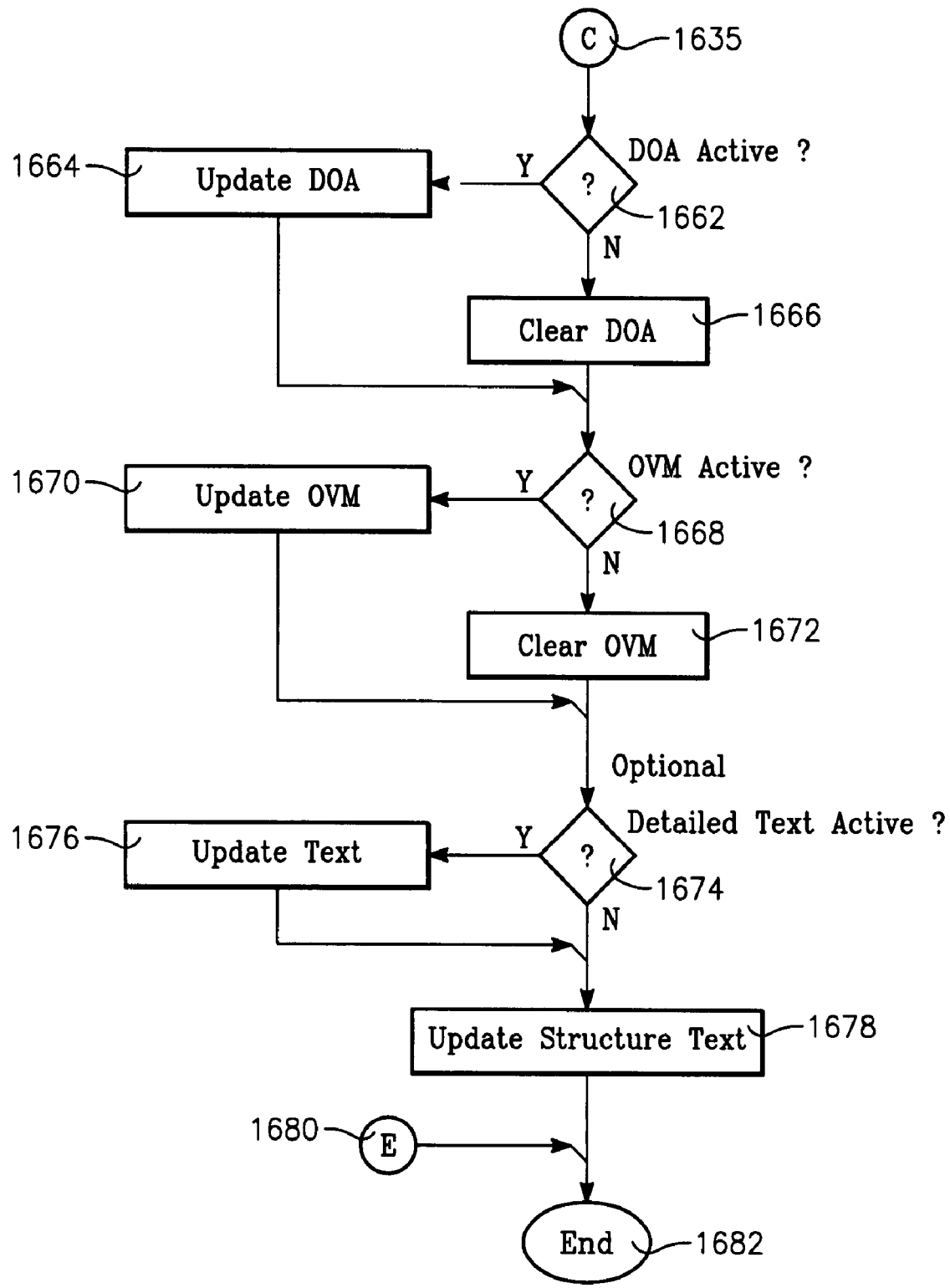
FIG. 15C is a third part of a flowchart for the display logic that is referenced in the high level functional block diagram in FIG. 13.

Together FIGS. 15A, 15B and 15C, comprise a software flowchart for the Prioritize Data task (FIG. 13 item 1500) and Publish Data Queue task (FIG. 13 item 1700) and describe the overall design and the steps necessary to prepare the information received from the Blackboard Housekeeping task (FIG. 13 item 1400) for display in flexible display formats defined by the user.

A primary function of the Display Management routine is to process time critical user commands for displaying the information to assess jam effectiveness as well as to command changes in the type of jamming employed by the EW aircraft. The Prioritize Data logic is based on categories such as Time Critical, Mandatory Timed, Mandatory Acknowledge, and Optional. The Prioritize Data logic sets a prioritized order for designated display fields: labels, structural text, Jam Threat Assessment text, advisory text (heading, altitude, speed, jam mode, etc.) and graphics elements such as EA and PE planned routes, projected positions, Threat Assessment Strobes, JAR volumes. Each display element falls into one of several priority categories listed in Table 1. The display elements in Table 1 are discussed in detail and defined later in this specification.

TABLE 1

| | Priority Categories | | |
|---|---|---|---|
| Time Critical | Mandatory Acknowledge | Mandatory Timed | Optional |
| Label status | Jam Mode Change | Advisory Text | Structure Text |
| Jam Threat Assessment | PE Comm | Graphics Elements | Detailed Text |
| | OVM Advisory | JAR Volumes DOA Elements OVM Elements | |

Each display element in Table 1 is then assigned a relative value as described in Table 2, Relative Significance, which allows a processing priority list to be generated. This Relative Significance priority list assures that the higher priority display elements that impact mission safety and success are processed before any other lower priority display elements.

TABLE 2

Relative Significance

| | Time Critical | Mandatory Acknowledge | Mandatory Timed | Optional |
|---|---|---|---|---|
| Priority | 1 | 2 | 3 | 4 |

Prior to the start of prioritizing data a check (FIG. 15A 1502) is made to determine if the Electronic Combat Decision Support System (ECDSS) is actively engaged in combat support processing. If the ECDSS is not active a check (FIG. 15A 1504) will be made to determine if the Jam Threat Assessment (JTA) displays have been selected by the aircrew. The JTA displays are the series of linked formats generated by the Display Management routine. If the JTA displays are selected then the JTA labels and advisories are updated (FIG. 15A 1506) and time critical processing begins. If the JTA displays are not selected (FIG. 15A 1508) then control is routed to the end of the flowchart (FIG. 15C 1680). If the check (FIG. 15A 1502) for ECDSS is active then the JTA labels and advisories are updated (FIG. 15A 1510) and time critical processing begins.

Figure 16:
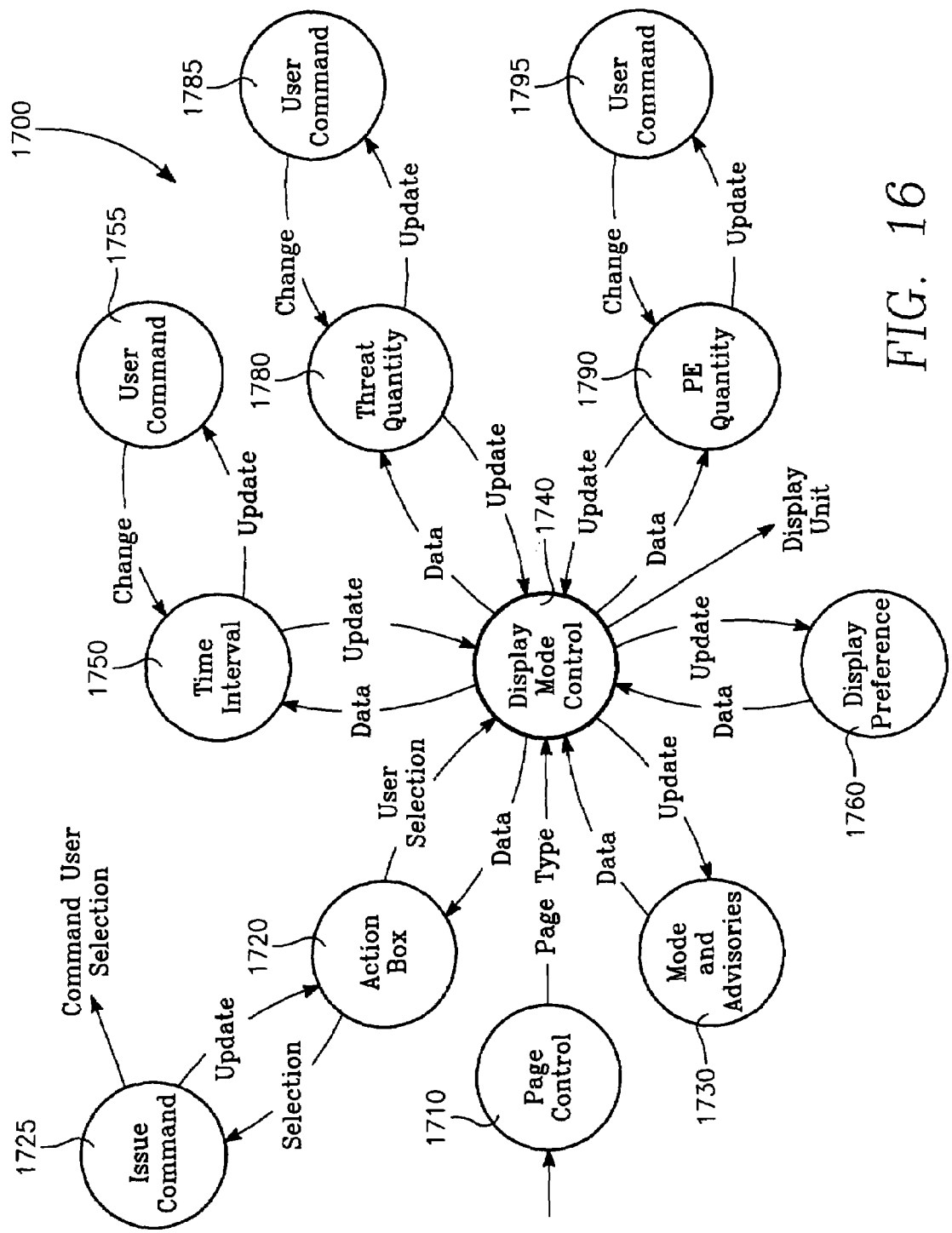
FIG. 16 is a state diagram describing user interaction with the display formats.

At the core of the Display Management routine is the software engine to enable the building of flexible display formats defined by the user. The software providing the flexibility for managing the display formats includes logic to generate push-tile labels, textual advisories, JAR graphics and jamming commands. The logic is best represented by the Display Management state diagram (FIG. 16). The relationship between the Display Management state diagram (FIG. 16) and the software flow chart (FIGS. 15A, 15B and 15C) is that the flow chart path is driven by a variable user input controlled by the events and states shown in the Display Management state diagram. The push-tile driven commands that control transitions through the state diagram create very flexible display formats that are only limited by the available JAR processing data and the performance limits of the chosen display unit hardware and software.

Figure 19:
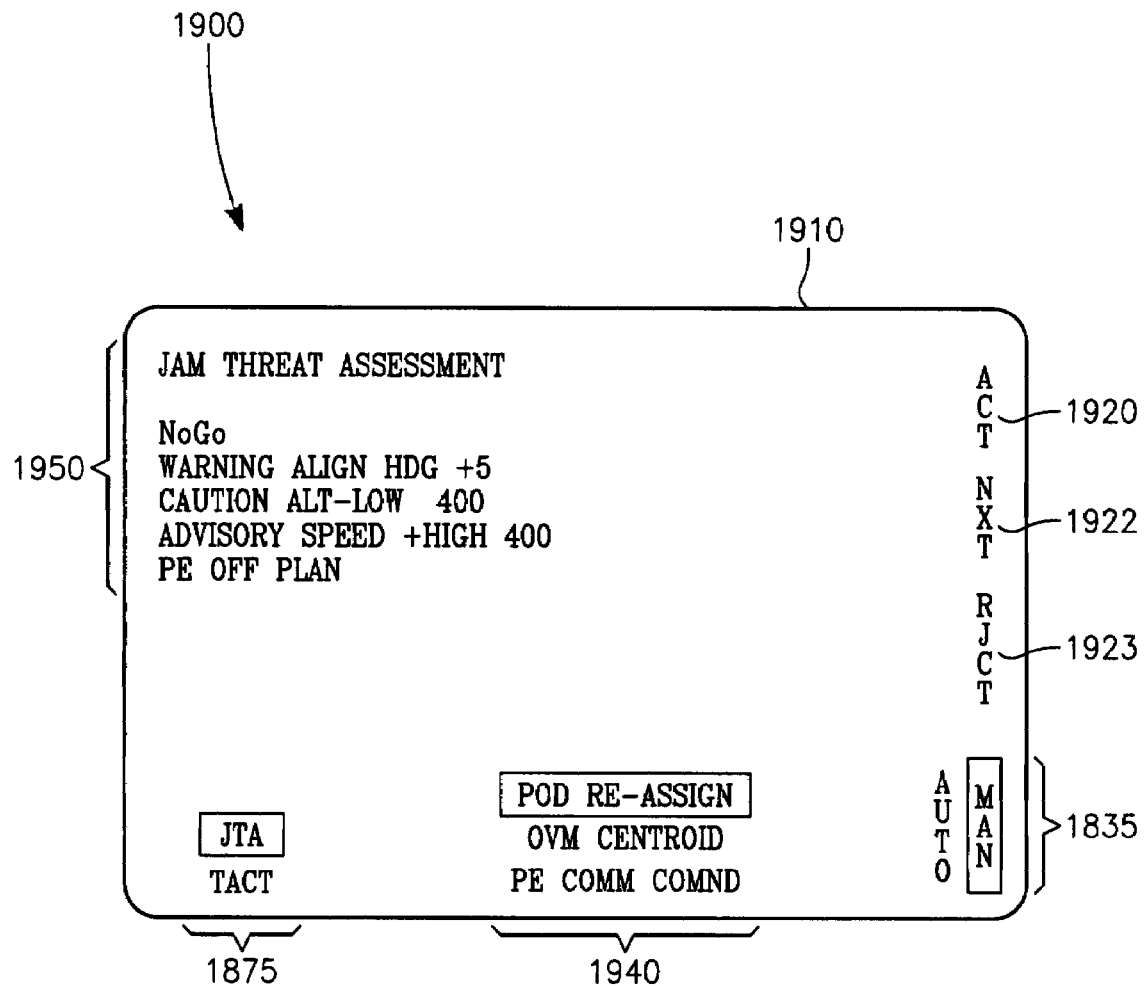
FIG. 19 is a drawing of a representative display format depicting advisories, warnings and a jamming equipment control interface.

In general, entry into the state diagram (FIG. 16) begins with the Page Control event 1710 being active when either the JTA displays are selected by the user (FIG. 15A item 1504) or the ECDSS active check (FIG. 15A item 1502) is positive. A command from Page Control 1710 is sent to Display Mode Control 1740 with the page type information necessary to build a display format. In the preferred embodiment, the initial display format commanded by Page Control (FIG. 16 item 1710) is that of FIG. 19 (item 1910) from which subsequent tactical displays may be invoked. In FIG. 19 the JTA label is boxed (item 1875) indicating that depressing the push-tile corresponding with item 1875 has been depressed and will transition to default display of FIG. 18 item 1880.

Referring to FIG. 18, upon transition to the default tactical format (1880) the user is provided with options to transition to any tactical display format defined by the user. Selectable tactical display formats are indicated by labels displayed above or next to a push-tile. As an example, two tactical display formats are selectable, RGAT (FIG. 17 item 1870) or LTLN (FIG. 18 item 1880), by manipulating the push-tile associated with display transitions 1820. The LTLN label is boxed (FIG. 18 item 1820) because it has been selected by the user. When the user depresses the push-tile 1820 corresponding to the tactical display formats the display transitions to the RGAT format (FIG. 17 item 1870) and the RGAT label is boxed. Should the user again depress the push-tile corresponding to the tactical display formats 1820 the display transitions back to the LTLN display format 1880. The number and type of selectable displays are defined by the user.

An exit control from the TACT mode back to the JTA mode is user defined and any combination of a push-tile and a label may be programmed for use on the displays. The exit control must communicate with the Page Control state (FIG. 16 item 1710) to define the page type for processing by the Display Mode Control (FIG. 16 item 1740) state.

Referring to FIG. 19, the JTA display 1910 has a number of fields containing time prioritized information (1835, 1940, 1950) as well as the push-tile labels (1920, 1922 and 1923) that provide a user interface with the Display Management routine. The jam options labels 1835 are associated with a rotary push-tile which allows the user to select Manual (MAN) or fully Automated (AUTO) jam control as the display state (FIG. 16 item 1730). While the MAN state is selected the ECDSS will monitor jam asset management parameters and provide the user with jam control advisories in an Action Box 1940. The Action Box states are under the control of the Action Box state machine (FIG. 16 1720).

The portion of the Display Management state diagram (FIG. 16) and the flowchart (FIG. 15A) pertaining to the handling of the Time Critical and Mandatory Acknowledgement items in Table 1, the first of which pertain to MAN and AUTO operation (FIG. 19 item 1835), are now described.

The Action Box state 1720 sends a selection event to the Issue Command state 1725 reflecting any one of a series of user defined jam control recommended actions and corresponding labels. The user is then provided with options to either accept (ACT item 1920) the recommended action, step to the next recommended action (NXT item 1922), or reject the recommended action (RJCT item 1923). The recommended actions are under software control and user defined. Three representative recommended actions are presented in FIG. 19 item 1940.

Referring to FIG. 19, the manual mode is active 1835 and the ECDSS has determined that the jamming Pod assigned to the current threat is not able to perform the assigned tasking and has generated a boxed POD RE-ASSIGN recommended action in the Action Box 1940. The ECDSS has also generated several other recommended actions such as a one versus many centroid (OVM CENTROID) as well as a recommended action to issue a PE communications command (PE COMM CMND) to alert the PE that it is off of the flight plan. Since the POD RE-ASSIGN recommended action is selected in the Action Box 1940 if the operator selects the ACT 1920 push-tile, the ECDSS system will activate the jam assignment change required to address the existing jam failure situation. If the operator selects the RJCT 1923 push-tile, the Pod Re-Assign advisory in Action Box 1940 will be removed. If the operator selects the NXT 1922 push-tile the system will step to the next recommended action in the Action Box 1940 list, here it is OVM CENTROID.

The PE alert indicating that the PE is off the flight plan (PE OFF PLAN) is written into an advisory text field 1950. If the user steps to the PE COMM CMND using the NXT (1922) push-tile and elects to reject the PE COMM CMND recommendation using the RJCT push-tile (1923) the PE OFF PLAN advisory will persist in the advisory text field (1950). Any number of alerts may be written into the advisory text field 1950 and tied to any number of recommended actions displayed in the Action Box 1940. The flexibility to display JAR information and interact with the displayed JAR information is the essence of the preferred embodiment of the invention as described in the Display Management state diagram (FIG. 16) and as shown in the representative display format drawings (FIGS. 17, 18 and 19).

Referring to FIG. 15A, a series of checks are performed to determine the state of the jam mode. A first check 1512 is made to determine if a Jam Mode Change is accepted. If the check 1512 returns a positive, indicating that the user has selected ACT (FIG. 19 item 1920), the Set Mode Command 1514 is enabled and any pending change is cleared 1516. If the first check 1512 returns a negative, a Jam Mode Change has not been accepted. A second check 1518 is then made to determine if a Jam Mode Change has been rejected. If the second check 1518 returns a positive, indicating that the user has selected RJCT (FIG. 19 item 1920) any pending change is cleared 1516 leading to a third check 1520. If the second check 1518 returns a negative, a Jam Mode Change has not been rejected leading to the third check 1520. The third check 1520 determines whether a Jam Mode Change needs to be activated as a result of the user selecting ACT (FIG. 19 item 1920). If the result of the third check 1520 is positive an advisory is posted 1522 and the Action Box state (FIG. 16 item 1720) sends an event to the Issue Command state (FIG. 16 item 1725) to issue an appropriate command to the ECDSS.

Referring to FIG. 15A, a series of checks are now performed to determine whether a PE communications command (PE COMM CMND, FIG. 19 item 1940) has been issued by the EA and sent to the PE. The PE communications command is the second Mandatory Acknowledgement task required per Table 1. A first check 1524 is made to determine if a PE communications command is accepted. If the check 1524 returns a positive, indicating that the user has selected ACT (FIG. 19 item 1920), the Set PE Command 1526 is enabled and any pending PE communication advisory is cleared 1530. If the first check 1524 returns a negative, a PE communications command has not been accepted. A second check 1528 is then made to determine if a PE communications command has been rejected. If the second check 1528 returns a positive, indicating that the user has selected RJCT (FIG. 19 item 1920) any pending PE communication advisory is cleared 1530 leading to a third check 1532. If the second check 1528 returns a negative, a PE communications command has not been rejected leading to the third check 1532. The third check 1532 determines whether a PE communications command needs to be activated as a result of the user selecting ACT (FIG. 19 item 1920). If the result of the third check 1532 is positive an advisory is posted 1534 and the Action Box state (FIG. 16 item 1720) sends a User Selection event to the Issue Command state (FIG. 16 item 1725) to issue an appropriate command to the ECDSS suite. Program execution continues with item 1535 providing a transition between FIG. 15A and FIG. 15B.

Referring to FIG. 15B, a series of checks are now performed to determine whether an OVM centroid (OVM CENTROID, FIG. 19 item 1940) display reference option has been selected by the user. The OVM centroid display reference option is the third Mandatory Acknowledgement task required per Table 1. A first check 1636 is made to determine if an OVM centroid display reference option is accepted. If the check 1636 returns a positive, indicating that the user has selected ACT (FIG. 19 item 1920), the Set OVM centroid display reference command 1642 is enabled and any pending OVM centroid display reference advisory is cleared 1646. If the first check 1636 returns a negative, an OVM centroid display reference command has not been accepted. A second check 1640 is then made to determine if an OVM centroid display reference command has been rejected. If the second check 1640 returns a positive, indicating that the user has selected RJCT (FIG. 19 item 1920) any OVM centroid display reference advisory is cleared 1642 leading to a third check 1644. If the second check 1640 returns a negative, an OVM centroid display reference command has not been rejected leading to the third check 1644. The third check 1644 determines whether an OVM centroid display reference command needs to be activated as a result of the user selecting ACT (FIG. 19 item 1920). If the result of the third check 1644 is positive an advisory is posted 1646 and the Action Box state (FIG. 16 item 1760) sends a user Selection event to the Display Control state (FIG. 16 item 1740).

Software execution continues with the processing of those tasks in the Mandatory Timed and Optional categories of Table 1. Referring to FIG. 15B, the Update Advisory Text step 1648 is performed and updates the advisories posted in the advisory text field (FIG. 19 item 1950). The advisories are user defined derived from the information supplied by JAR processing, EOB, ECDSS operational status, PE status and navigational aids.

As previously described, the preferred embodiment of the Display Management routine includes two types of display formats, JTA (FIG. 19) and TACT (FIG. 17 and FIG. 18). The JTA display is discussed above. The TACT display format contains graphical display elements such as a JAR (FIGS. 1, 2, 3 and 11), a JAS (FIGS. 7, 8, 9, 10, 12), PE position, EA position and planned flight paths. FIG. 17 item 1870 and FIG. 18 item 1880 are representative of the types of graphical displays a software programmer skilled in the art of aircraft display graphics may implement. The TACT display formats are essential as an aircrew decision aid, which is object of this invention. Graphical representation of the threat emitter's effectiveness in the presence of active EA jamming allows the EA aircrew to rapidly assess the vulnerability of any assigned PE.

Referring to FIG. 15B, after the advisory textual elements are updated 1648 a series of checks are made to properly maintain the TACT display graphics. First a check 1650 is made to determine whether or not the TACT graphical displays are active. If the response is positive and the TACT graphics are active the TACT graphics are updated 1652. If the response to the check 1650 is negative the graphics are cleared from memory 1654 and Display Management execution continues. The display units posting the JTA displays are used by other platform systems for display purposes that may be of more interest to the user. Consequently, there may not be a display unit available for posting the JTA displays. Item 1635 provides a transition between FIG. 15B and FIG. 15C as program execution continues.

In general, it is well known by those skilled in the art of programming aircraft displays that user preferences encompassing display type, display reference point and the structure of the displayed elements vary and are best implemented in software. Examples of common display types are range versus bearing, azimuth versus elevation and direction of arrival. Examples of common reference points are aircraft stabilized and earth stabilized. Examples of structure for the displayed elements are an OVM display, viewing all of the JAR data at once, viewing all of the JAS data at once, displaying selected portions of the JAR or JAS data as well as viewing PE and EA information. The Display Management routine includes a Display Preference state 1760 containing the software code to generate combinations of display types, display references and display element structures.

Referring to FIG. 15C, after the maintenance of the TACT graphics is completed a series of checks are made to determine the user preferences for the viewing the displayed graphics and text. A first check 1662 is made to determine if the user preference for the display type is direction of arrival (DOA). If DOA check 1662 is positive then a DOA Update 1664 event is sent to the Display Reference state 1760. If the DOA check 1662 is negative the DOA is cleared 1666 by the Display Reference state 1760. A second check 1668 for OVM active is made to determine if the user preference for the display type is OVM. If OVM check 1668 is positive then an OVM Update 1670 event is sent to the Display Reference state 1760. If the OVM check 1668 is negative the OVM is cleared 1672 by the Display Reference state 1760.

The DOA and OVM check and response logic blocks in FIG. 15C are representative of the type of logic blocks that may be duplicated for any number or combination of user display preferences. The present invention provides the flexibility to customize the aircrew decision aid displays and the above examples are not meant to limit the scope of the invention to the displays disclosed. Any limitation encountered is related to the processing capability and size of the digital memory of the computer selected by the user.

Referring to FIG. 15C, after the display of the highest priority display information in Table 1 is completed a series of checks are made to determine whether any of the optional text requires updating. The optional text consists of those display elements that may be dropped from a JTA or TACT display should the display processor functionality degrade as it reaches it's processing throughput limits. Optional text is of two types, Structure Text and Detailed Text. Examples of Structural Text are the axis for the RGAT display (FIG. 17 items 1812 and 1814), the axis 1812 labels in feet (FT), the axis 1814 labels and numbers in nautical miles (NM). An example of Detailed Text is the JTA page identification text, JAM THREAT ASSESSMENT (FIG. 19 item 1950). A first check 1674 is made to determine if the optional text requires updating. If the Detailed Text Active check 1674 is positive then an Update Text 1676 event is sent to the Display Preference state 1760. If the Detailed Text Active check 1674 is negative then an Update Structure Text 1678 event is sent to the Display Preference state 1760. Execution ends with step 1682.

In the preferred embodiment, a user is provided a number of opportunities to configure the displays to best represent the available information through the use of a rotary. Referring to FIG. 17, item 1805 is a cluster of labels associated with push-tiles for controlling the time reference for the display format. One label corresponds to incrementing the time (FWD) and another label corresponds to decrementing the time (BCK). The boxed numerical value (3) corresponds to the number of minutes into the future the displayed information is extrapolated. The aircrew may change the extrapolation time either forward to four minutes or back to two minutes as desired. In the preferred embodiment the maximum extrapolation time is set to five minutes. The duration of extrapolation time windows are under control of the software programmer subject to processing throughput constraints and a user requirement.

Referring to FIG. 16, a user selection of a FWD or BCK push-tile will send a Change event from the User Command state 1755 to the Time Interval state 1750 which in turn sends an Update event to the Display Control state 1740 for display processing. The Display Control state 1740 then sends a Data event to the Time Interval state 1750 which sends an Update event to the User Command state 1755 providing feedback that the command and response to the command is complete and ready for display on the display units.

In yet another preferred embodiment, a user is provided another opportunity to configure the displays to best represent the available information through the use of a rotary. Referring to FIG. 17, item 1810 is a cluster of labels associated with push-tiles for controlling the threat graphics displayed. In this example, the JAR graphic displayed has an index of one as represented by the boxed numeral one. A JAR graphic is composed of the JAR coverage areas (FIG. 17 item 215, 230, and 250) and the relative PE and EA positions as shown in FIG. 17. Each JAR graphic is assigned an index in a display list for record keeping and assuring consistency across the display formats as the display configuration commands are processed. By depressing the NXT 1810 push-tile the boxed numeric increments from a one to a two corresponding to the second threat in the threat display list. At this point, the JAR graphic for the first threat is removed from the display allowing the user to only view the second threat JAR graphic, not shown. A subsequent depression of the NXT 1810 push-tile increments to the third threat in the threat display list and leads to the removal of the second threat JAR graphic. Repeated depressions of the push-tile associated with the PREV (1810) label decrements the numeric to its minimum value providing the opportunity for the user to rotate through the threat display list in the opposite direction. The JAR graphics in the threat display list may be individually viewed in this manner until the rotary steps to an all (ALL) position or a multiple (M) position.

The ALL position allows the user to view all of the threats in the threat display list simultaneously. This results in a cluttered display with many overlapping display elements in the event that there are numerous threats with closely space JAR graphic symbols. To alleviate this problem the user is provided with a multiple (M) option in the rotary. The M option allows the user to cursor designate, or hook, any individual threat JAR graphic and remove that JAR graphic symbol set from the display. This allows the user to view the desired number of threats in the threat display list.

The ability of the user to control the number of displayed threats is a feature that is necessary to de-clutter the display format allowing the user to focus on any particular threat should multiple overlapping JAR graphics render the display unreadable.

User selection of a NXT or PREV push-tile will send a Change event from the User Command state 1785 to the Threat Quantity state 1780 which in turn sends an event to the Display Control state 1740 for display processing. The Display Control state 1740 then sends a Data event to the Threat Quantity state 1780 which sends an Update event to the User Command state 1785 providing feedback that the command and response to the command is complete and ready for display on the display units.

In still yet another preferred embodiment, a user is provided another opportunity to configure the displays to best represent the available information through the use of a rotary. Referring to FIG. 17, item 1815 is a cluster of labels associated with push-tiles for controlling the display of threats associated with a particular PE. This feature is useful in the event that a user is interested in viewing all of the threats that are capable of detecting a particular PE. By depressing the NXT push-tile the boxed numeric increments from a one to a two if there is a second PE available in the display list. All of the threats that can detect the second PE will be displayed and the threats associated with the first PE are removed from the display. Repeated depressions of the NXT push-tile will increment the numeric to it's maximum value then to an ALL choice. The ALL will return all of the PEs and the associated threats to the display list allowing the user to once again view all of PEs and threats. Repeated depressions of the PREV push-tile decrements the numeric to it's minimum value providing the opportunity for the user to rotate through the PE list in the opposite direction. Rotation to the ALL position from the minimum direction returns all of the PEs and threats to the display.

User selection of a NXT or PREV push-tile will send a Change event from the User Command state 1795 to the PE Quantity state 1790 which in turn sends an event to the Display Control state 1740 for display processing. The Display Control state 1740 then sends a Data event to the PE Quantity state 1790 which sends an Update event to the User Command state 1795 providing feedback that the command and response to the command is complete and ready for display on the display units.

The Time 1805, THRT 1810 and PE 1815 groups of labels are common across multiple display formats as shown in FIG. 18. In the preferred embodiment, it is necessary to provide consistency in display operation to the extent possible. Referring to FIG. 17 and to FIG. 18, the push-tile legends are placed in the same position and retain the same functionality as the display formats are transitioned. The consistency in display operation also provides the additional benefit of minimizing the software programming and minimizing execution time for program operation regarding the management of displays.

In order to more effectively provide information to the user the preferred embodiment incorporates a color scheme for displaying text and graphics. The Display Management routine needs to assure that unambiguous caution and advisory cues are provided to the user and that high priority caution and advisory cues are readily identifiable. In the preferred embodiment, all text and graphic displays will utilize a defined set of standard colors to convey information as listed in Table 3.

TABLE 3

Display Colors

| Color | Meaning | Use |
| --- | --- | --- |
| White | Informative structure | Body Text, Title, Heading, etc. |
| Green | No action required | Dynamic graphic/text |
| Cyan (Blue) | Advisory, Action Eminent | Dynamic graphic/text |
| Yellow | Caution, Action Impending | Dynamic graphic/text |
| Red | Warning, Action Required | Dynamic graphic/text |
| Pink (Flesh) | Informative, Possible Action | Dynamic graphic/text |
| Black | None | Background |

The capability the applicant's invention to rapidly provide situational awareness to the aircrew by taking advantage of JAR processing information and in turn displaying the results of JAR processing in a highly flexible format controlled by the aircrew is best illustrated by example.

The example is, the user is presented with five overlapping JAR graphics associated with three PEs drawn on a single RGAT (FIG. 18) display format. The resulting display is cluttered with text and graphics impeding a quick assessment of the effectiveness of the EA. The EA is assigned PE1 as a primary assignment and wishes to view only those threats for PE1. The user depresses the NXT push-tile to rotate the PE display numeric from ALL to 1. The display now depicts three threats associated with PE1 while simultaneously suppressing the text and graphics for PE2 and PE3. The user then determines that emitter threat two is not relevant due to the color of the threat graphics and elects to de-clutter the display by removing all traces of threat emitter two graphics and text. The user then depresses the NXT push-tile until the M is present then designates threat two for deletion from the display list. The user now is provided the information to assess the current effectiveness of the EA in a clear and de-cluttered format. The user then desires a view of the scenario two minutes into the future and depresses the Time FWD push-tile until the numeric is 2. The display is updated with the appropriate extrapolation and the user then assesses the future effectiveness of the EA. The user is able to rapidly assess the effectiveness of the EA in protecting the PE and obtaining a situational awareness quickly and with little effort.

It is not necessary to limit the implementation of the invention to the preferred embodiments described in this specification, to currently existing platform computers, to currently existing platform interfaces or to current electronic warfare capabilities. The nature of this invention is a JAR processing algorithm which invokes an embedded software routine to build displays that are readily adaptable to a number of platforms, user requirements and user environments.

The terms aircraft and platform as well as aircrew and user have been used throughout this specification interchangeably. One skilled in the art of electronic warfare will adapt the applicant's invention to any platform that operates in any area which requires rapid assessment of defensive and offensive electronic warfare capability.

What is claimed is:

1. A computer program product in a computer readable medium having computer program code recorded thereon, wherein a program code includes sets of instructions comprising:

first computer instructions for accepting a plurality of inputs including a result of a jamming acceptability region processing algorithm, a system status sent from an electronic warfare suite, and a plurality of user commands generated by manipulating a plurality of software programmed interfaces;

second computer instructions for maintaining a computer memory containing data in a prioritized order wherein the data in said computer memory includes the results of said jamming acceptability region processing algorithm, said system status sent from said electronic warfare suite, and said plurality of user commands generated by manipulating said plurality of software programmed interfaces;

third computer instructions for saving to a digital memory a snap shot of said computer memory;

fourth computer instructions for identifying a manipulation of said software programmed interfaces to configure a plurality of display formats wherein said plurality of display formats convey the results of said jamming acceptability region processing algorithm and convey said system status sent from said electronic warfare suite;

fifth computer instructions for presenting a plurality of alphanumeric characters representing advisories and warnings dictated by the results of said jamming acceptability region processing algorithm, said system status sent from said electronic warfare suite and said plurality of user commands generated by manipulating said plurality of software programmed interfaces;

sixth computer instructions for drawing a plurality of graphical representations depicting a coverage pattern for a threat emitter system correlated with the results of said jamming acceptability region processing algorithm;

seventh computer instructions for an operation controlling said electronic warfare suite by manipulating said plurality of software programmed interfaces, wherein the operation of said electronic warfare suite is dictated by the results of said jamming acceptability region processing algorithm, said system status sent from said electronic warfare suite and said coverage pattern for said threat emitter system; and eighth computer instructions for communicating a command to a protected entity wherein said command describes an action to be taken by said protected entity, said action dictated by the results of said jamming acceptability region processing algorithm, said system status sent from said electronic warfare suite and said coverage pattern for said threat emitter system.

* * * * *